(12) United States Patent
Uesugi et al.

(10) Patent No.: US 8,146,453 B2
(45) Date of Patent: Apr. 3, 2012

(54) MOTION GUIDE DEVICE

(75) Inventors: Masakazu Uesugi, Tokyo (JP); Kentaro Nishimura, Tokyo (JP); Satoshi Fujita, Kyoto (JP); Akimasa Yoshida, Tokyo (JP); Satoru Nagai, Tokyo (JP); Hiroyuki Arai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 728 days.

(21) Appl. No.: 11/815,712

(22) PCT Filed: Feb. 3, 2006
(Under 37 CFR 1.47)

(86) PCT No.: PCT/JP2006/301889
§ 371 (c)(1),
(2), (4) Date: Jan. 5, 2009

(87) PCT Pub. No.: WO2006/082936
PCT Pub. Date: Aug. 10, 2006

(65) Prior Publication Data
US 2010/0058885 A1    Mar. 11, 2010

(30) Foreign Application Priority Data
Feb. 7, 2005    (JP) .................................. 2005-030848

(51) Int. Cl.
*F16H 25/22* (2006.01)
*F16C 33/37* (2006.01)
(52) U.S. Cl. .................... 74/424.82; 74/424.86; 384/522
(58) Field of Classification Search ............... 74/424.89, 74/424.82, 424.83, 424.86, 424.87; 384/51, 384/520, 521, 522
See application file for complete search history.

(56) References Cited

U.S. PATENT DOCUMENTS
3,208,806 A    9/1965    W. Grolmann et al.
(Continued)

FOREIGN PATENT DOCUMENTS
DE    3246348 A1    6/1984
(Continued)

OTHER PUBLICATIONS
International Search Report of PCT/JP2006/301889, date of mailing Mar. 28, 2006.
(Continued)

*Primary Examiner* — Thomas R Hannon
*Assistant Examiner* — Phillip A Johnson
(74) *Attorney, Agent, or Firm* — Westerman, Hattori, Daniels & Adrian, LLP

(57) ABSTRACT

A motion guide device is provided which comprises a chain of rollers in which retainers are interposed, in which the chain of rollers is given a degree of freedom of rotation. The motion guide device comprises a track member (5) on which a roller rolling part (5a) is formed which allows rollers (7) to roll on along the roller rolling part; a moving member (6) on which a loaded roller rolling part (6a) facing the roller rolling part (5a) is formed; a plurality of rollers (7) arranged on a roller circulation path containing a loaded roller rolling path (9) formed between the roller rolling part (5a) of the track member (5) and the roller rolling part (6a) of the moving member (6); and a plurality of retainers (8) respectively interposed between rollers of the plurality of rollers (7). The plurality of retainers (8) are mutually separated, each of the retainers (8) which is divided into a first divided member (31) contacting one roller of a pair of rollers (7) with each retainer (8) sandwiched therebetween and a second divided member (32) contacting the other roller (7) of the pair of rollers, and the first divided member (31) is allowed to rotate relative to the second divided member (32).

9 Claims, 20 Drawing Sheets

U.S. PATENT DOCUMENTS

| | | | |
|---|---|---|---|
| 4,687,345 A | 8/1987 | Geka | |
| 2001/0038724 A1 | 11/2001 | Murata | |
| 2001/0048776 A1 | 12/2001 | Kawaguchi et al. | |

FOREIGN PATENT DOCUMENTS

| | | | |
|---|---|---|---|
| GB | 1175810 A | | 12/1969 |
| JP | 6217425 A | | 1/1987 |
| JP | 11210858 A | | 8/1999 |
| JP | 2000-161364 A | | 6/2000 |
| JP | 2000161459 A | | 6/2000 |
| JP | 2001-132746 A | | 5/2001 |
| JP | 2001263445 A | | 9/2001 |
| JP | 2001295839 A | | 10/2001 |
| JP | 2003240094 A | | 8/2003 |
| JP | 2004068882 A | * | 3/2004 |
| WO | 0192762 A1 | | 12/2001 |
| WO | 03072966 A1 | | 9/2003 |

OTHER PUBLICATIONS

European Search report dated Jul. 29, 2009, issued in corresponding European Patent Application No. 06713032.8.

Notification of Transmittal of Translation of the International Preliminary Report on Patentability (Form PCT/IB/373 and Form PCT/ISA/237) of International Application No. PCT/JP2006/301889 mailed Aug. 7, 2007.

* cited by examiner

VIEW TAKEN ALONG IV-IV AND
SEEN IN THE DIRECTION OF ARROWS (A)  (B)

(A) STRAIGHT  (B) CIRCULAR (A)   (B)

MOTION GUIDE DEVICE

TECHNICAL FIELD

The present invention relates to a motion guide device, such as screw devices, linear guides and ball splines, in which a moving member is moved relative to a track member.

BACKGROUND ART

A ball screw equipped with a screw shaft, a nut and balls disposed between the screw shaft and the nut so as to allow their roll motions is able to reduce a friction coefficient in rotating the screw shaft to the nut, compared to a sliding contact type screw. Hence, the ball screw is put into practical use in various mechanical fields such as positioning mechanisms and feeding mechanisms of machine tools and robots and steering gears of automobiles.

In recent years, to raise an amount of allowable load, a roller screw equipped with rollers, as rolling members, instead of balls has been invented as disclosed in, for example, patent reference 1. In this roller screw, a screw shaft is provided to have an outer circumferential surface on which a roller rolling groove is formed, and a nut is provided to have an inner circumferential surface on which a spiral loaded roller rolling groove is formed to face the roller rolling groove of the screw shaft. There is formed a loaded roller rolling path between the roller rolling groove of the screw shaft and the loaded roller rolling groove of the nut and a plurality of rollers serving as rolling members are disposed on the loaded roller rolling path for accommodation therein. In the nut, a non-loaded roller return path is formed to connect one end of the loaded roller rolling path to the other end thereof. This non-loaded roller return path enables circulation of the rollers rolling on along the loaded roller rolling path.

FIG. 26 shows a retainer 51 assembled in a roller screw proposed by the present applicant. This retainer 51 is arranged between, of a plurality of rollers, each adjacent two rollers to prevent the two rollers from contacting each other. On each end of the retainer 51 in the moving direction thereof, there is formed a concave surface 53 of which a contour is inconformity with the outer circumferential surface of each roller.

FIGS. 27(A) and 27(b) each shows a chain of rollers with such retainers 51 assembled with the rollers. Rollers 52 are cross-arranged in such a manner that axial lines of adjacent two of the rollers 52 are perpendicular to each other when being viewed along the moving direction of the rollers 52.

DISCLOSURE OF THE INVENTION

Problems to be Solved by the Invention

In general, the non-loaded roller return path of the roller screw is twisted so that, the rollers roll on the non-loaded roller return path with their attitudes varying along the twisted path. Further, a transit part transferring from the loaded roller rolling path to the non-loaded roller return path is also twisted slightly, whereby the rollers change their directions on the transit path with the aid of a small amount of rotation of each roller. Still further, from a more detailed viewpoint, the loaded roller rolling path itself is formed in the spiral form and thus twisted.

When the rollers roll on along this twisted circular path, it is required that each roller change its attitude relative to that of the next roller (in detail, when being viewed along the moving direction of the rollers, it is required that the axial line of each roller, which has kept so far its perpendicularity to that of the roller which follows next, slightly change relatively.)

As shown in FIG. 27(A), when the conventional retainer is used, the retainer 51a is able to move in the first direction (1) which is along a contact surface between the retainer 51a and the following roller 52a. And, relatively to the following roller 52b, the retainer 51b positioned backward by one piece is able to move in the second direction (2) which is along a contact surface between the retainer 51b and the following roller 52b (that is, when being viewed along the moving direction (3) of the rollers, the retainer 51b is allowed to move in a direction perpendicular to the first direction (1)). However, movements in directions other than the above are not allowed. Accordingly, relative to the moving direction (3) of the rollers, the roller chain can change its rolling direction between only the mutually-perpendicular two directions, and thus cannot change its rolling direction to directions other than the above two directions (in other words, it can be said that the roller chain has only two degrees of freedom when the roller chain changes its rolling direction). FIG. 27(B) shows a case where the roller chain is changing its rolling direction).

In addition, although not shown, the rollers can be parallel-arranged such that the axial lines of adjacent rollers are kept parallel with each other. However, in this parallel arrangement, the roller chain can change its rolling direction to only one direction perpendicular to the moving direction of the rollers, namely, either the first direction (1) or the second direction (2) (in other words, the roller chain has only one degree of freedom with regard to its rolling direction).

When such conventional retainers are used, it is difficult for a preceding roller to make its attitude cope well with the circulation path, relative to the roller which follows next. This is attributable to the fact that, as to the rolling direction, degrees of freedom other than the one or two degrees of freedom are not given to the roller chain. Hence, when the conventional retainer is used to deliberately make the roller chain circulate along the complicated circulation path of a roller screw, various concerns may arise which are for example occurrence of a slight gap between a roller and a retainer, application of an excessive force to retainers and occurrence of an excessive slip between a roller and the roller rolling groove.

Therefore, an object of the present invention is to provide a motion guide device in which a chain of rollers with retainers each arranged between adjacent two of the rollers is able to have a higher degree of freedom of its rotation.

[Patent reference 1] Japanese Patent Laid-open Publication No. 11-210858.

Means for Solving the Problems

The present invention will now be described below. In the followings, reference numerals appearing in the accompanying drawings are added to components in brackets for ease in understanding the present invention, but it is not intended that the present invention is limited to the modes shown in the drawings.

In order to solve the foregoing problem, the present inventors have adopted the structure in which each retainer is divided into two parts so that the retainer itself is given a degree of freedom of rotation. Specifically, in accordance with a first aspect of the present invention the foregoing problem is solved by adopting a motion guide device comprising: a track member (5) having a roller rolling part (5a) formed to allow roller rotation; a moving member (6) having a loaded roller rolling part (6a) formed facing the roller rolling part (5a); a plurality of rollers (7) arranged on a roller circulation path (9, 10) including a loaded roller rolling path (9) formed between the roller rolling part (5a) of the track member (5) and the loaded roller rolling part (6a) of the moving member (6); and a plurality of retainers (8, 34, 43) each interposed between adjacent two of the plurality of rollers (7), wherein that the plurality of retainers (8, 34, 43) are mutually separated, each of the retainers (8, 34, 43) is divided into a first divided member (31, 41) contacting one of the adjacent two rollers (7) and a second divided member (32, 42) contacting the other of the adjacent two rollers (7), and the first divided member is allowed to rotate relative to the second divided member.

In accordance with a second aspect of the invention, in the motion guide device according to the first aspect, the first divided member (31, 41) is not coupled with the second divided member (31, 42).

In accordance with a third aspect of the invention, in the motion guide device according to the first aspect, the first divided member (31) and the second divided member (32) are coupled with each other with an elastic member (33) placed therebetween.

In accordance with a fourth aspect of the invention, in the motion guide device according to the second aspect, the first divided member (31) has a first retainer contact surface (32b) contacting the second divided member (32) and being formed into a plane crossing perpendicularly to a moving direction of the rollers (7), and the second divided member (32) has a second retainer contact surface (32b) contacting the first divided member (31) and being formed into a plane crossing perpendicularly to the moving direction of the rollers.

In accordance with a fifth aspect of the invention, in the motion guide device according to any one of the first aspect through the fourth aspect, the plurality of rollers (7) are cross-arranged in such a manner that each adjacent two of the rollers (7) with corresponding one of the retainers (8) sandwiched therebetween have axial lines perpendicular to each other when the rollers (7) are viewed along the moving direction thereof.

In accordance with a sixth aspect of the invention, in the motion guide device according to the second aspect, the first divided member (41) has a first retainer contact surface (41b) contacting the second divided member (42) and being formed into a convex curved surface directed toward the second divided member (42), and the second divided member (42) has a second retainer contact surface (42b) contacting the first divided member (41) and being formed into a convex curved surface directed toward the first divided member (41).

In accordance with a seventh aspect of the invention, in the motion guide device according to the sixth aspect, the rollers are parallel-arranged in such a manner that each adjacent two of the rollers (7) with corresponding one of the retainers (43) sandwiched therebetween have axial lines parallel with each other, when the rollers (7) are viewed along a moving direction thereof.

In accordance with an eighth aspect of the present invention, in the motion guide device according to any one of the first aspect through the seventh aspect, the first divided member (31, 41) has a first roller contact surface (31a, 41a) contacting one of the adjacent two rollers (7) and having a concave curved surface which is in agreement with an outer shape of the roller (7), and the second divided member (42) has a second roller contact surface (32a, 42a) contacting the other of the adjacent two rollers (7) and having a concave curved surface which is in agreement with an outer shape of the roller (7).

In accordance with a ninth aspect of the invention, the foregoing problem is solved by providing a roller screw comprising: a screw shaft (5) having a spiral roller rolling groove (5a) formed on an outer circumferential surface thereof; a nut (6) having a loaded roller rolling groove (6a) formed facing the roller rolling groove (5a); a plurality of rollers (7) arranged on a roller circulation path (9, 10) including a loaded roller rolling path (9) formed between the roller rolling groove (5a) of the screw shaft (5) and the loaded roller rolling groove (6a) of the nut (6); and a plurality of retainers (8, 34, 43) each interposed between adjacent two rollers of the plurality of rollers (7), wherein the plurality of retainers (8, 34, 43) are mutually separated, each of the retainers (8, 34, 43) is divided into a first divided member (31, 41) contacting one roller (7) of the adjacent two rollers (7) with the retainer (8, 34, 43) sandwiched therebetween and a second divided member (32, 42) contacting the other roller (7) of the adjacent two rollers, and the first divided member (31, 41) is allowed to rotate relative to the second divided member (32, 42).

In accordance with the first aspect of the invention, each retainer is divided into the first and second divided members and the first divided member is formed to be rotatable relative to the second divided member, thus giving a degree of freedom of rotation to the retainer itself. Thus, a chain of rollers can be given multiple degrees of freedom of movements, leading to smooth direction changes even when the chain passes along complex circulation paths.

In each of the retainers, the first and second divided members may not be coupled with each other, as provided by the second aspect of the invention. Because the first and second divided members are positionally restricted by the adjacently positioned rollers and the walls of the path, the problems that the first divided member is shifted from the second divided member or the first and second divided members are separated from each other are preventable well, without coupling both the first and second divided members.

In accordance with the third aspect of the invention, coupling parts of each retainer with the elastic member makes it easier to assemble the retainers into the circulation path of the motion guide device.

In accordance with the fourth aspect of the invention, relative to the second divided member, the first divided member can be rotated on the rotation axis served by the moving direction of the rollers.

In accordance with the fifth aspect of the invention, the rolling direction of the rollers can be changed between both of the first and second directions which are perpendicular to the moving direction.

In accordance with the sixth aspect of the invention, as the first divided member can be moved three-dimensionally relative to the second divided member, a further degree of freedom of movement can be gained in addition to the degree of freedom of the rotation. Especially, in accordance with the seventh aspect of the invention, such a movement structure is effective when the rollers are parallel-arranged.

In accordance with the eighth aspect of the invention, the proper attitudes of the rollers can be retained by the retainers.

The present invention is especially effective for the roller screw as provided by the invention according to the ninth aspect as the circulation path of the roller screw is likely to be twisted.

Figure 1:
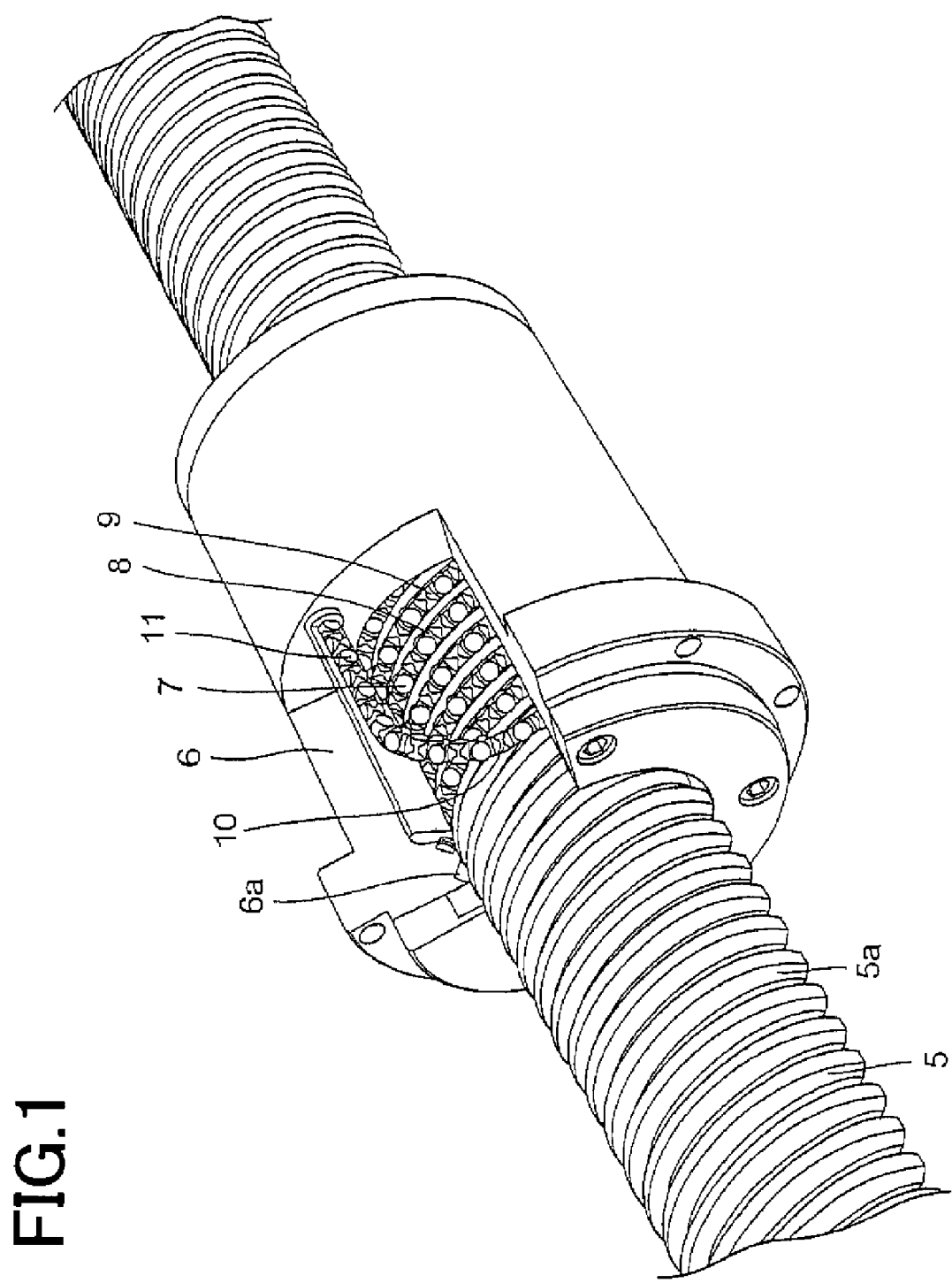
FIG. 1 is a perspective view showing a roller screw according to a first embodiment of the present invention.

DESCRIPTION OF REFERENCES 5a roller rolling groove (roller rolling part)
5 screw shaft (track member)
6 nut (moving member)
6a loaded roller rolling groove (loaded roller rolling part)
7 roller
8, 34, 43 retainer
9 loaded roller rolling path
10 non-loaded roller return path
31, 41 first divided member
31a, 41a first roller contact surface
31b, 41b first retainer contact surface
32, 42 second divided member
32a, 42a second roller contact surface
32b, 42b second retainer contact surface
33 elastic member

BEST MODE FOR CARRYING OUT THE INVENTION

The present invention can be applied to a motion guide device, such as screws, linear guides and ball splines, in which there are provided a moving member and a track member and the moving member is moved relative to the track member. In the following, the motion guide device will be described as being a roller screw.

FIG. 1 shows a perspective view of a roller screw. This roller screw has a screw shaft 5, which serves as a track member and has an outer circumferential surface on which a spiral roller rolling groove 5a is formed along which rollers roll, and a nut 6, which serves as a moving member and has an inner circumferential surface on which a spiral loaded roller rolling groove 6a is formed to face the roller rolling groove 5a. There is formed a loaded roller rolling path between the roller rolling groove 5a of the screw shaft 5 and the loaded roller rolling groove 6a of the nut 6. On the loaded roller rolling path, a plurality of roller 7 are placed in such a manner that mutually adjacent two of the rollers 7 have their axial lines crossing each other. In the plurality of rollers 7, there are provided a plurality of retainers 8 each interposed to avoid mutually adjacent two of the rollers 7 from coming in contact with each other. The retainers are not linked with each other and separated from each other.

When the nut 6 is rotated relative to the screw shaft 5, the plurality of rollers 7 roll to move on along the loaded roller rolling path 9 formed between the roller rolling groove 5a and the loaded roller rolling groove 6a. The rollers 7, which have rolled to reach one end of the loaded roller rolling path 9, pass through a non-loaded roller return path 10, and then returns to the other end of the loaded roller rolling path 9 positioned a few threads back. The loaded roller rolling path 9 and the non-loaded roller return path 10 compose an endless roller circulation path.

Figure 2:
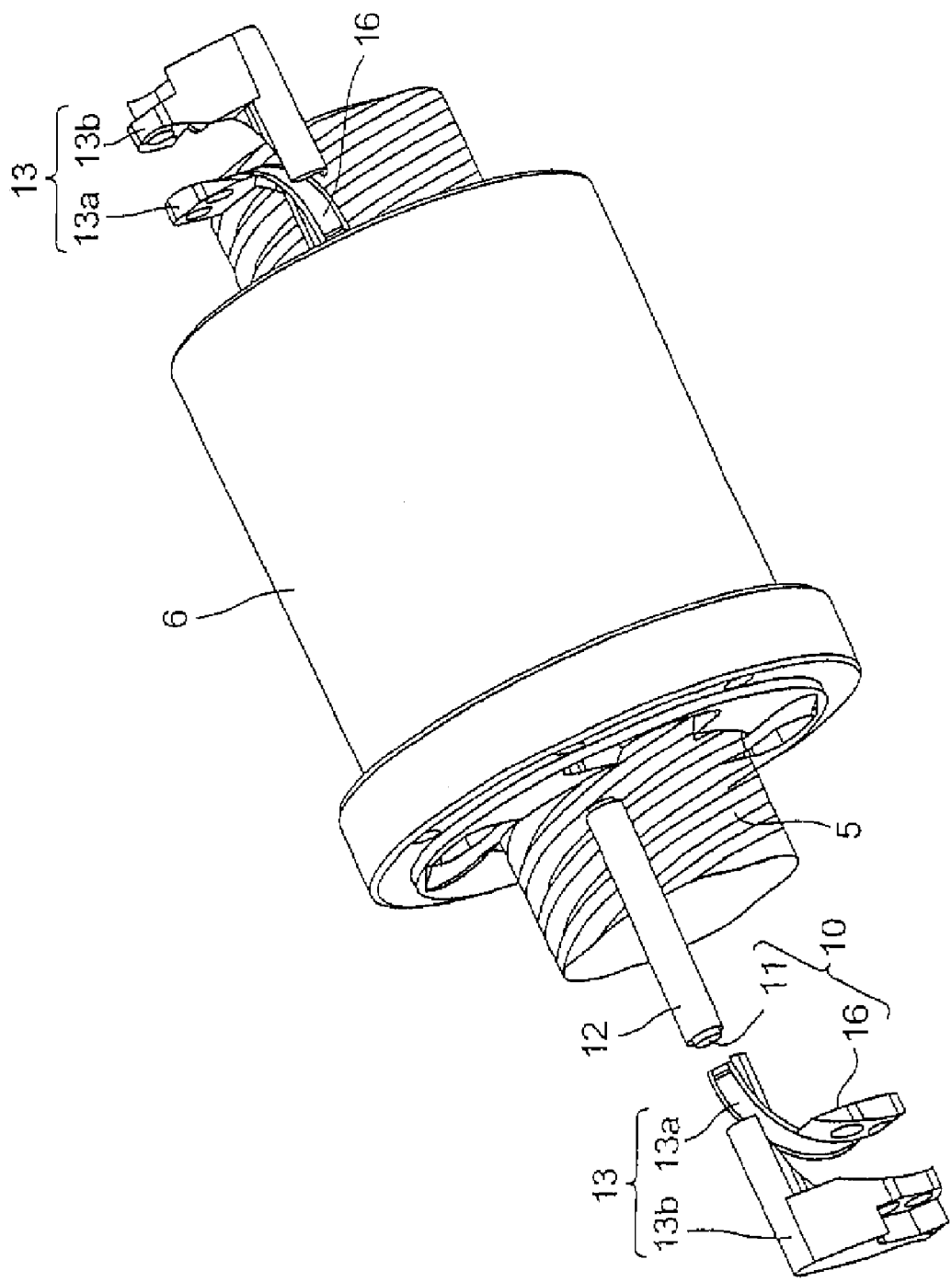
FIG. 2 is a perspective view showing disassembled main parts of the roller screw.

FIG. 2 is a perspective view showing circulation members 12 and 13 by which the non-loaded roller return path 10 is formed. The non-loaded roller return path 10 has a straight path 11 formed to extend in parallel with the axial line of the nut 6 and arch-like direction-change paths 16, which serve as curved members, located at both ends of the straight path 11 to connect the straight path 11 and the loaded roller rolling path 9.

The nut 6 has a through-bore formed to extend in parallel with the axial line of the screw shaft 5, and a pipe 12 is inserted through this through-bore. In the pipe 12, the straight path 11 is formed having a quadrangular section and providing a straight-line track. As detailed later, the straight path 11 is twisted to allow the attitudes of the rollers 7 to rotate as the rollers 7 move on along the straight path 11.

To both axial end faces of the nut 6, direction-change path components 13 are secured, respectively. In each direction-change path component 13, the direction-change path 16 is provided that has an arch-like track and a quadrangular section. Each direction-change path component 13 is divided into two parts consisting of an inner circumferential side 13a and an outer circumferential side 13b along the diagonal line of the quadrangular section of the direction-change path 16. These inner and outer circumferential sides 13a and 13b of the direction-change path component 13 have flanges, respectively. The inner and outer circumferential sides 13a and 13b of the component 13 are overlapped one on the other and positioned on each of the axial end faces of the nut 6, before the flanges are secured to the axial end face of the nut 6 by fixing means such as bolts. Because each end of the pipe 12 is formed to be fit into the direction-change path component 13, securing the direction-change path component 13 to the nut 6 results in that the pipe 12 is also secured to the nut 6.

Figure 3:
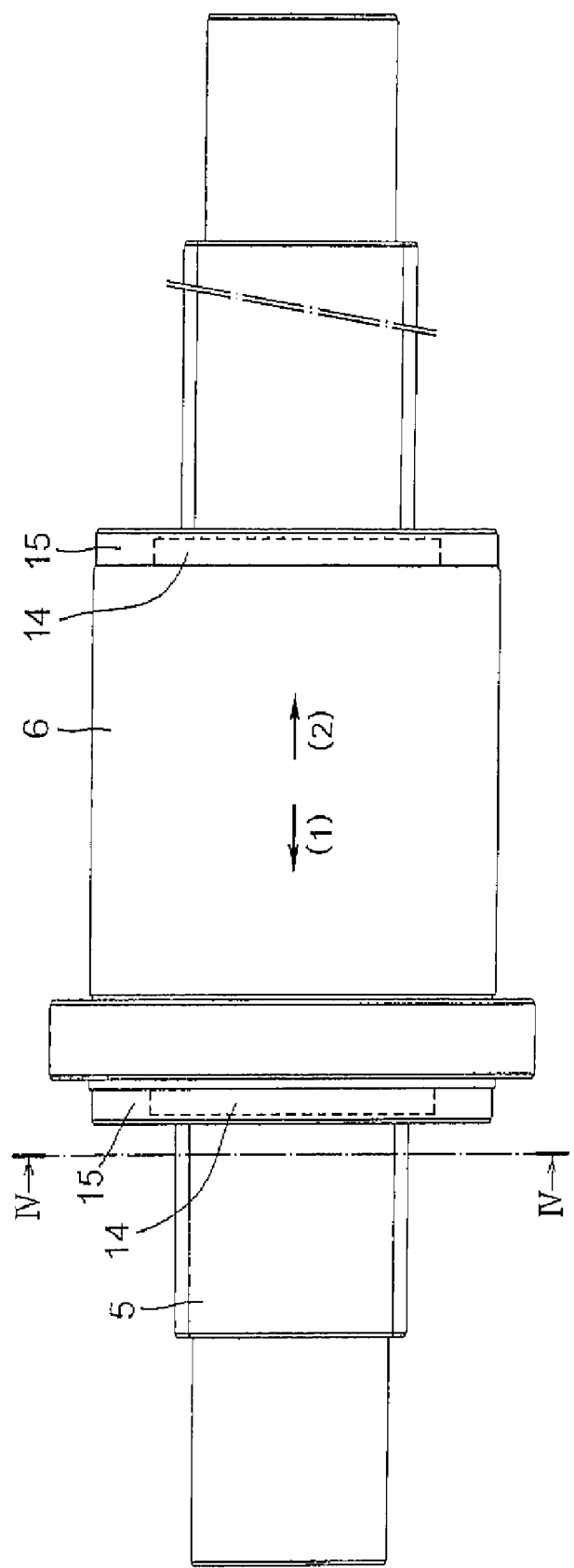
FIG. 3 is a side view showing the roller screw in which all the parts are assembled.
Figure 4:
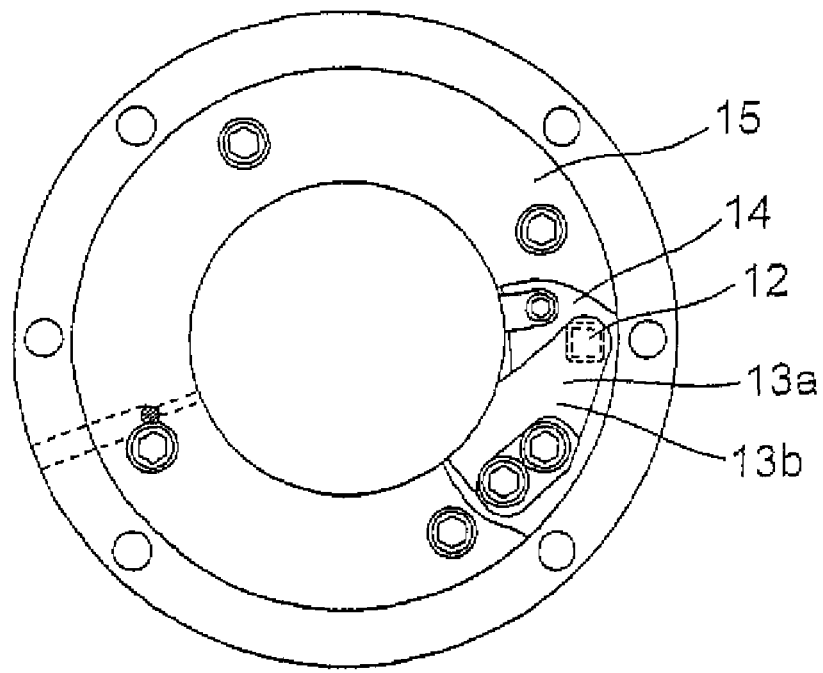
FIG. 4 is a sectional view taken along the IV-IV line in FIG. 3.

FIG. 3 shows a side of the roller screw, while FIG. 4 shows a section taken along the IV-IV line in FIG. 3. On each end of the nut 6 in its axial-line directions, in which the pipe 12 and the direction-change path component 13 are incorporated, a labyrinth seal 14 is disposed to remove foreign matters and prevent lubricant from leaking from inside the nut 6. To each end of the nut 6, a cap 15 enclosing the labyrinth seal 14 is attached.

Figure 5:
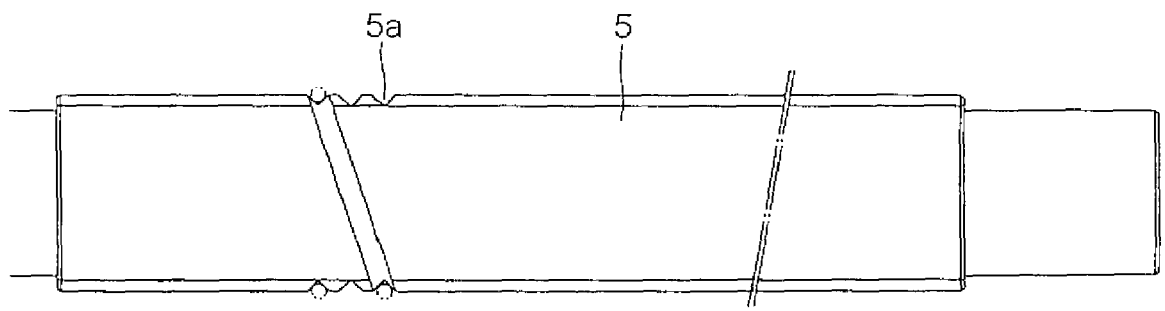
FIG. 5 is a side view showing a screw shaft.

FIG. 5 shows the screw shaft 5. On the outer circumferential surface of the screw shaft 5, the spiral roller rolling groove 5a having a predetermined lead is formed. In the present embodiment, to increase an amount of allowable load and shorten the overall length of the nut 6, the roller rolling groove 5a is set in the number of orbits to four. Alternatively, the number of orbits composing the roller rolling groove 5a may be set to various numbers such as one, two or three.

Figure 6:
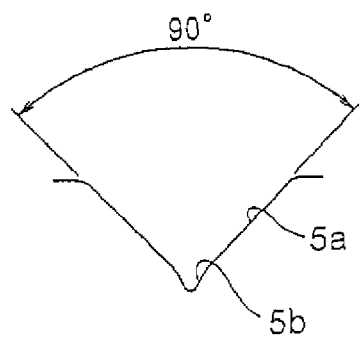
FIG. 6 is a sectional view showing that a roller rolling groove formed on the screw shaft has a right-angle sectional shape.

FIG. 6 shows a sectional contour of the roller rolling groove 5a on the screw shaft 5, which sectional contour is depicted as a right-angle sectional groove. Practically the section of the roller rolling groove 5a has a V-shaped contour whose opening angle is 90 degrees. The roller rolling groove 5a has a bottom formed into a circular arc portion 5b for grinding relief to allow the 90-degree portion to be ground.

Figure 7:
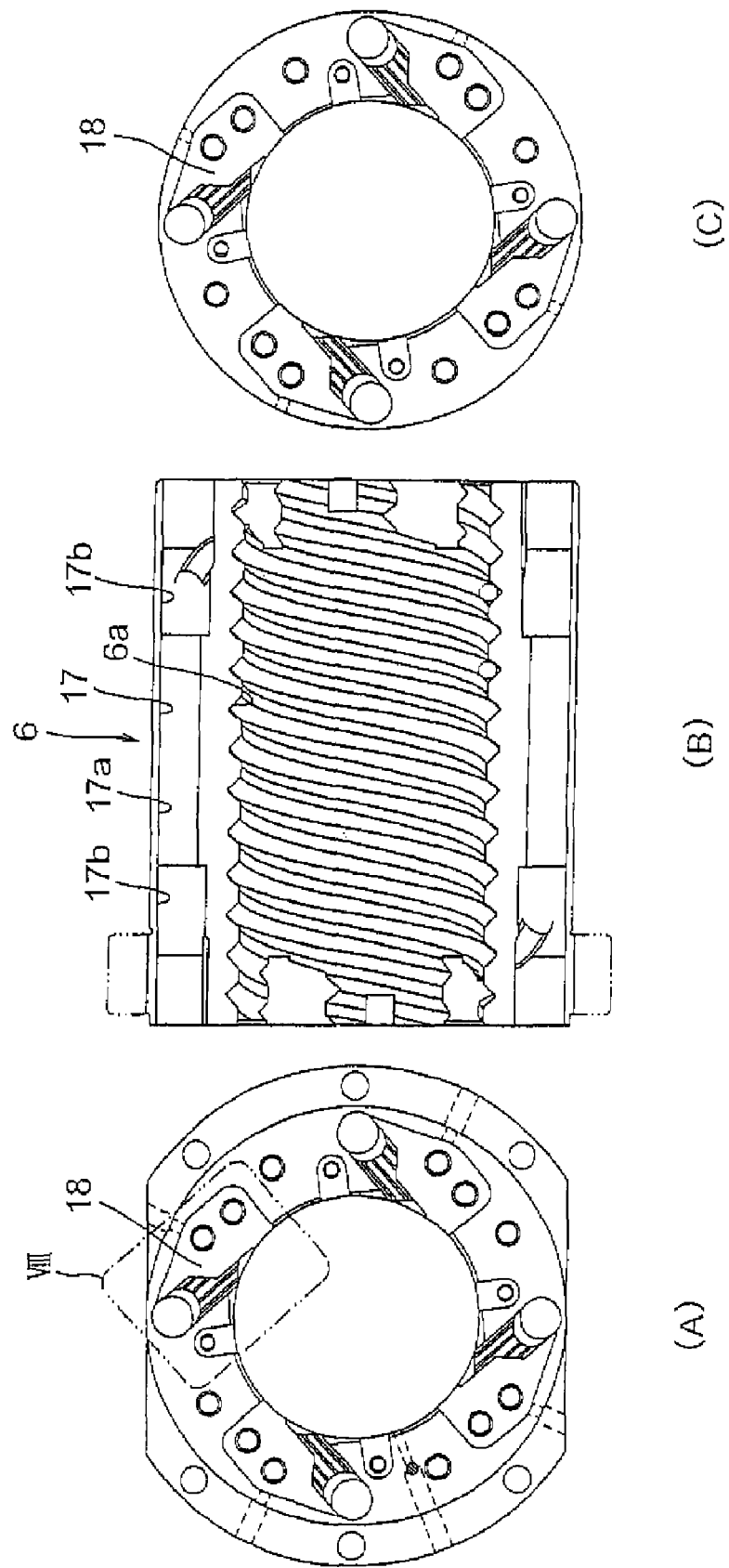
FIGS. 7(A) to 7(C) show detailed views of a nut 6 (FIG. 7(A) shows a frontal view of a nut, FIG. 7(B) shows a sectional view taken along the axial line of the nut, and FIG. 7(C) shows a rear view of the nut).

FIGS. 7(A) to 7(C) show in detail the nut 6. FIG. 7(A) shows a frontal view of the nut 6, FIG. 7(B) shows a section along the axial line thereof, and FIG. 7(C) shows a rear view of the nut 6. On the inner circumferential surface of the nut 6, the spiral loaded roller rolling groove 6a is formed and opposed to the roller rolling groove 5a of the screw shaft 5. In addition, a through-bore 17 is formed through the nut 6 so as to extend along the axial line thereof. The through-bore 17 has a central part 17a made smaller in diameter and both end parts 17b located on both axial sides of the central part and made slightly larger in diameter than the central part 17a. The pipe 12 is inserted through the central part 17a of the through-bore 17 and the direction-change path components 13 are inserted into the respective ends 17b. On each of the end surfaces of the nut 6, a mounting seat 18 is formed to allow each direction-change path component 13 to be attached to the nut 6. Pipes 12 and pairs of direction-change path components 13 provided are equal in number to the loaded roller rolling grooves 6a (in the present embodiment, four), with the result that the four loaded roller rolling grooves 6a are formed to circulate the rollers 7 therealong.

Figure 8:
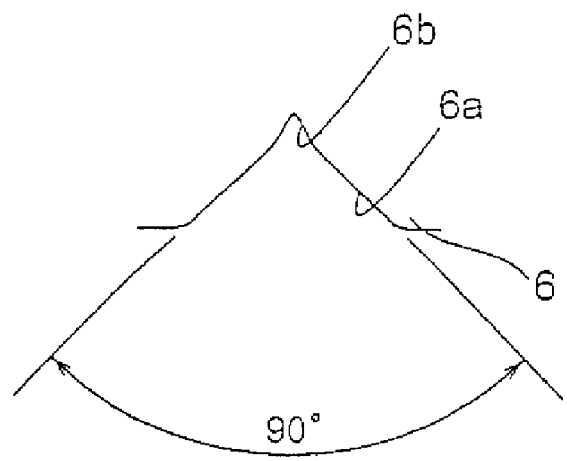
FIG. 8 is a sectional view showing that a loaded roller rolling groove formed on the nut has a right-angle sectional shape.

FIG. 8 shows that the loaded roller rolling groove 6a of the nut 6 having a right-angle section. Practically the section of the loaded roller rolling groove 6a has a V-shaped contour whose opening angle is 90 degrees. The loaded roller rolling groove 6a has a bottom formed into a circular arc portion 6b for grinding relief to allow the 90-degree portion to be ground.

Figure 9:
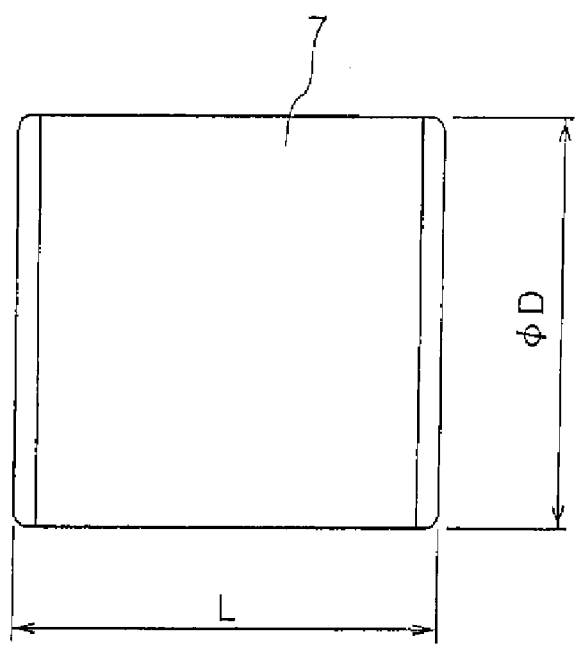
FIG. 9 is a side view of a roller.

FIG. 9 shows a side surface of each roller 7. Each roller rolling on along the loaded roller rolling path 9 is cylindrical and has a diameter D and a height L which are approximately equal to each other (precisely, the diameter D is slightly greater than the height L). Hence the shape of the roller 7 is square when a side view thereof is observed.

Figure 10:
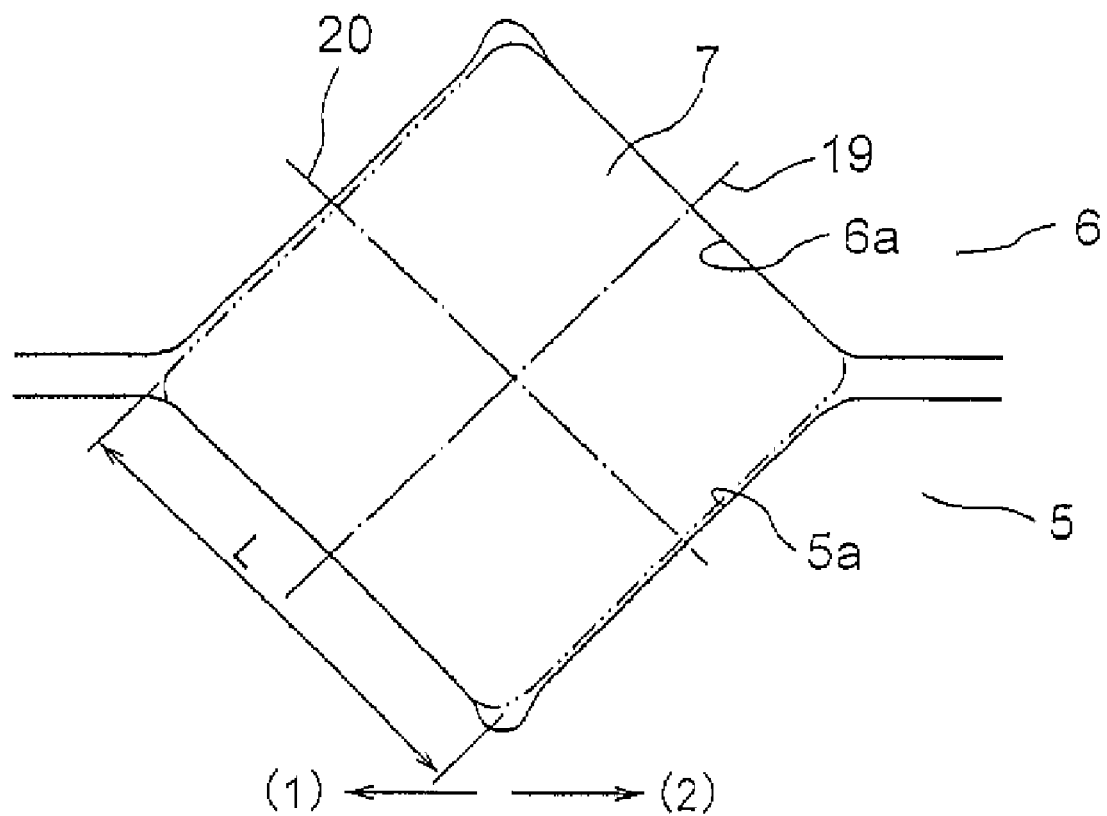
FIG. 10 is a sectional view showing the roller located in a loaded roller rolling path.

In the present embodiment, the sections of the loaded roller rolling path 9 and the non-loaded roller return path 10 are formed as being square, in agreement with the side-viewed contour of the roller 7. FIG. 10 shows the roller 7 accommodated in the loaded roller rolling path 9. The roller 7 is placed between the wall surface of the roller rolling groove 5a and the wall surface of the loaded roller rolling groove 6a of the nut 6 facing the roller rolling groove 5a, so that the surface of the roller 7 is compressed therebetween for being loaded. Thus one-way loading only in the axial line of the screw shaft 5 is allowed. Concretely, as contrasted to the fact that a single ball is allowed to be loaded in both one direction of the axial line directions of the screw shaft and the opposite direction to the one direction, the single roller 7 is allowed to be loaded in one direction (1) or the other direction (2) in the axial line direction of the screw shaft 5 (in FIG. 10, being loaded in only the one direction (1)). For realizing loading in both directions (1) and (2) along the axial line of the screw shaft 5, it is necessary to arrange the rollers 7 such that the axial lines 19 and 20 of mutually-adjacent rollers 7 cross each other at a right angle when being viewed along the moving direction of the rollers 7.

In addition, the crossing arrangement of the rollers in the present embodiment can be realized in various forms. One form is that rollers 7 being loaded in the one direction (1) are the same in the number of pieces as those being loaded in the opposite direction (2). When it is desired that amounts of allowable load in both directions are made different from each other, the number of rollers 7 being loaded in the one direction (1) is made different from that of rollers being loaded in the other direction (2). When the number of rollers is made different between both directions, amounts of allowable load available in both directions (1) and (2) can be changed arbitrarily.

The diameter D of each roller 7 is slightly larger than a distance between the wall surface of the roller rolling groove 5a of the screw shaft 5 and the wall surface of the loaded roller rolling groove 6a of the nut 6, facing that of the roller rolling groove 5a, which is called "oversize." Adopting this oversize causes the rollers in the loaded roller rolling path 9 to be deformed elastically, and load resulting from the elastic deform is given within the nut 6 as pre-compression load. Owing to the fact that the rollers 7 are cross-arranged in the loaded roller rolling path 9, the loads transmitted from mutually-adjacent rollers 7 to the nut 6 act in directions which are repulsive from each other.

Figure 11:
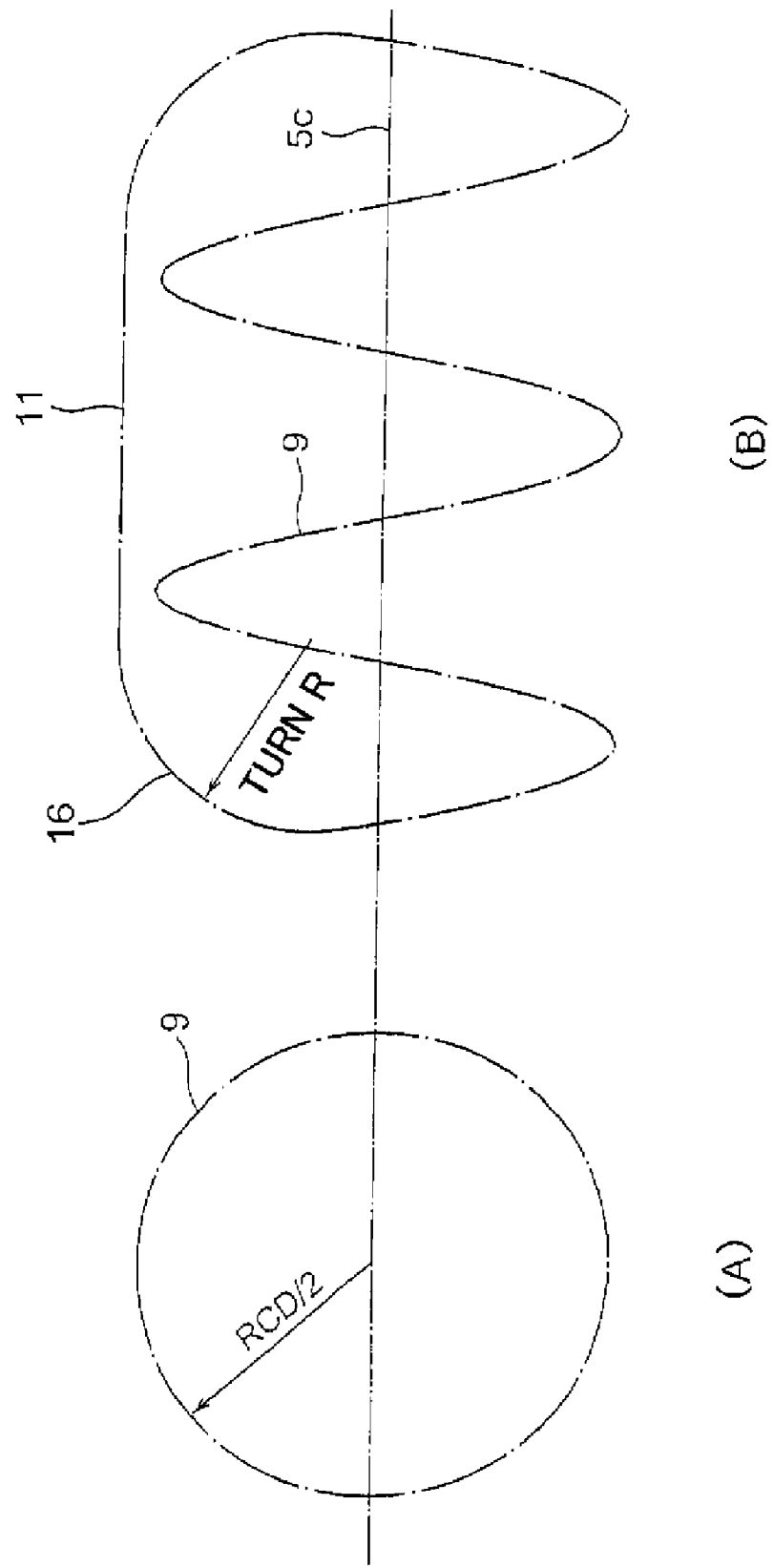
FIGS. 11(A) and 11(B) are views explaining a central line of a track along which each roller circulates, the track consisting of the loaded roller rolling path formed into a spiral path, an arch-like direction-change path, and a straight path.

FIGS. 11A and 11(B) show the spiral loaded roller rolling path 9 and the center line of a track drawn by the rollers 7, which circulates along the arch-like direction-change path 16 and the straight path 11. FIG. 11(A) shows the track drawn by the rollers 7 moving along the loaded roller rolling path 9 (when being viewed along the axial-line directions of the screw shaft 5), whilst FIG. 11(B) shows a track drawn by the rollers 7 circulating along an overall circulation path which is endless (the figure shows a state where the track is viewed from the lateral side of the screw shaft 5). The track drawn by the rollers 7 along the loaded roller rolling path 9 becomes a circle of a radius of RCD/2, when being viewed along the axial line of the screw shaft 5. Meanwhile the track drawn by the rollers 7 along the straight path 11 of the non-loaded roller return path 10 becomes a straight line parallel with the axial line 5c of the screw shaft 5. The track drawn by the rollers 7 along each of the direction-change paths 16 becomes a circular arc of a curvature radius of R.

The seam joints of these loaded roller rolling path 9, direction-change paths 16, and straight path 11 are formed to be continuous in the tangential directions to the track drawn by the rollers 7. Practically, at each seam joint between the loaded roller rolling path 9 and each of the direction-change path 16, the tangential directions to each direction-change path 16 are made to agree with the tangential directions to the central line of the loaded roller rolling path 9, when being viewed along the axial-line directions of the screw shaft 5, and also made to agree with the lead angles of the loaded roller rolling path, when being viewed laterally to the screw shaft 5. And at each seam joint between the straight path 11 and each of the direction-change paths 16, the tangential directions to each direction-change path 16 are made to agree with a direction in which the central line of the straight path 11 extends.

FIGS. 12A and 12(B) show a positional relationship between the one direction-change path component 13 attached to one axial end face of the nut 6 and the other direction-change path component 13 attached to the other axial end face. As described above, the central line of the straight path 11 of the non-loaded roller return path 10 extend in parallel with the axial line 5c of the screw shaft 5. As shown in FIG. 12(A), the central line of the direction-change path 16 extends in a tangential direction of the central line of the loaded roller rolling path 9, when being viewed along the axial line direction of the screw shaft 5. Both the central lines of the direction-change paths 16 located at both axial end faces cross at a predetermined opening angle γ, provided the angle is observed in the axial direction of the nut 6. A tendency is that the larger the curvature radii of the direction-change paths 16, the greater the opening angle γ. Although it will be detailed later, the straight path 11 is formed to enable the attitudes of the rollers 7 to be rotated by an angle approximately equal to this opening angle while the rollers move along this path.

FIGS. 13A and 13(B) and FIGS. 14A and 14(B) show the inner circumferential side 13a of each of the direction-change path components. This inner circumferential side 13a of each direction-change path component comprises a main body 21 along which a direction-change path of a curvature radius R is formed and a flange member 22 attached to each axial end face of the nut 6. Of both ends of the main body 21, one end has a scooping member 21a scooping up the rollers 7 in the loaded roller rolling path 9. The other end of the main body 21 is fit in the pipe 12. The scooping member 21a of the inner circumferential side 13a cooperates with a scooping member formed at the outer circumferential side 13b to scoop up, in the tangential direction, the rollers 7 rolling on along the spiral loaded roller rolling path 9. Each direction-change path 16 receives each roller 7 which has been scooped up, and immediately changes its direction, before allowing the direction-changed roller to be moved along the arch-shaped direction-change path 16.

FIGS. 15A and 15(B) and FIGS. 16A and 16(B) show the outer circumferential side 13b of each of the direction-change path component. This outer circumferential side 13b of each direction-change path component comprises a main body 25 on which the direction-change path 16 of a curvature radius R is formed and a flange member 26 attached to each axial end face of the nut 6. Of both ends of the main body 25, one end has a scooping member 25a scooping up the rollers 7 in the loaded roller rolling path 9. The other end of the main body 25 is fit in the pipe 12. The scooping member 25a of the outer circumferential side cooperates with the scooping member 21a formed at the inner circumferential side to scoop up, in the tangential direction, the rollers 7 rolling on along the spiral loaded roller rolling path 9. Each direction-change path 16 receives each roller 7 which has been scooped up, and immediately changes its direction, before allowing the direction-changed roller to be moved along the arch-shaped direction-change path 16. Further, on the outer circumferential side 13b of each direction-change path component is formed a protruded part 27 of which contour is made to agree with the shape of the roller rolling groove 5a of the screw shaft 5. This protruded part 27 is intended to raise the strength of the scooping member 25a. The direction-change path components are made of for example metal or resin.

Figure 17:
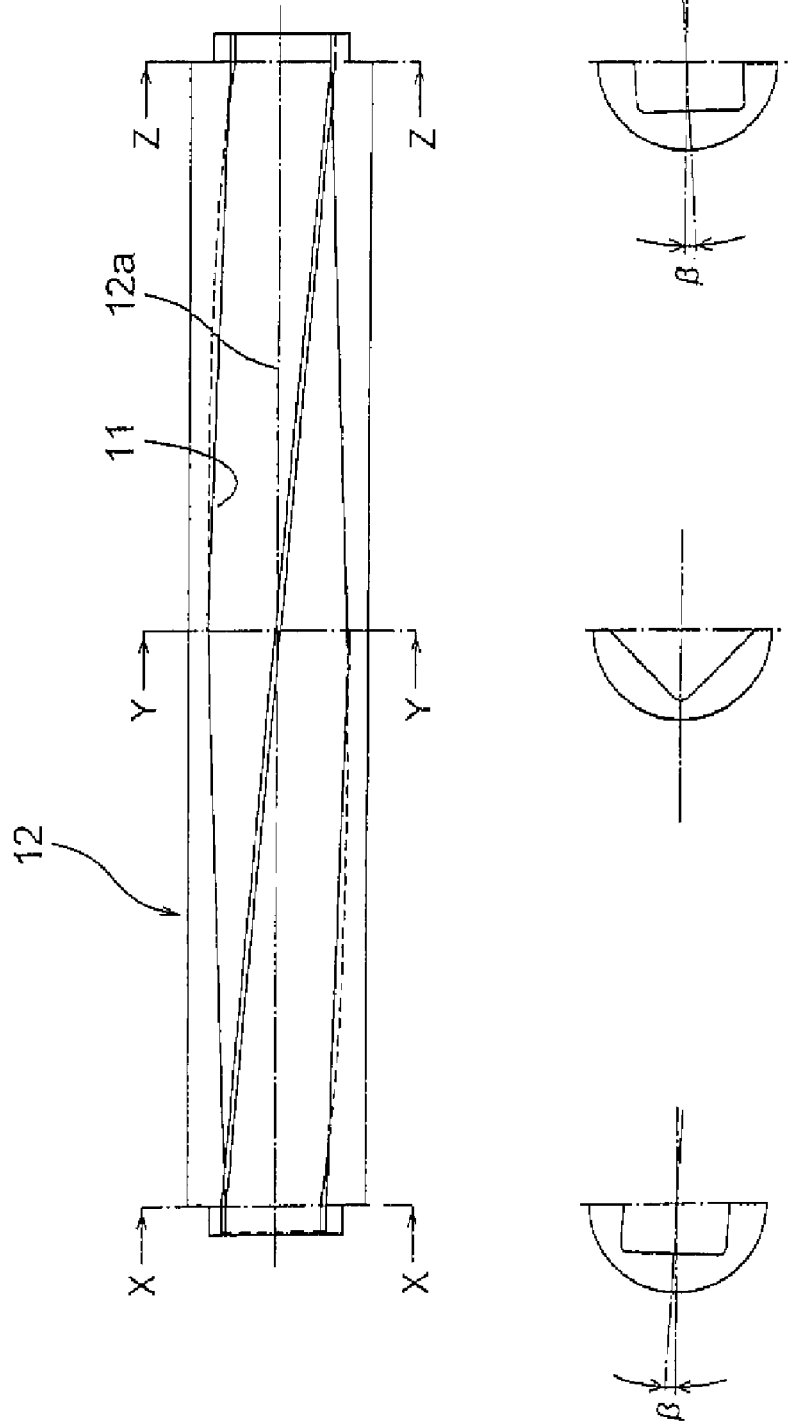
FIG. 17 explains various sectional views of a pipe.

FIG. 17 shows a sectional view of the pipe 12. The straight path 11 of the non-loaded roller return path 10 is formed to be twisted such that, while the rollers 7 pass through the straight path 11, the rollers 7 rotate their attitudes. While the rollers 7 move along the central line 12a of the straight path 11, the rollers 7 rotate on the central line 12a. In this configuration, a moving distance of each roller 7 is proportional to a rotated angle of the roller 7. In the present embodiment, when each roller 7 moves through the non-loaded roller return path 10 from one end to the other end thereof, the roller 7 is subject to rotation of "some 90 degrees+2β degrees" (which is almost equal to the opening angle γ between the paired direction-change paths (refer to FIG. 12), which opening angle is viewed along the axial line of the screw shaft). The pipe 12 is divided into two parts along the central line thereof. This pipe is made of for example metal or resin.

Figure 18:
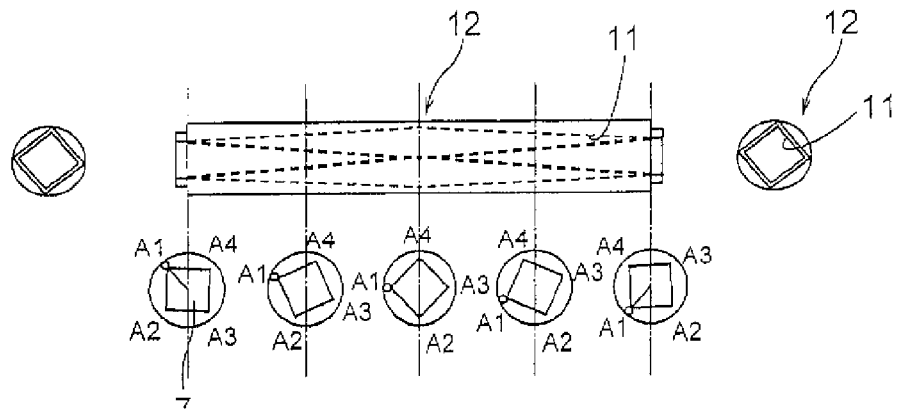
FIG. 18 explains rotational attitudes of a roller moving along the straight path.

FIG. 18 explains the attitudes of each roller 7 which moves on along the straight path 11. From the illustrations shown in FIG. 18, it is understood that, during a movement on along the straight path 11, a certain position A1 of the roller 7 moves from an obliquely upward left position to an obliquely downward left position, thus giving a rotation of an approximately 90 degrees to the attitude of each roller 7.

The attitude of each roller 7 is rotated while traveling on along the straight path 11. This rotation makes it possible that the attitude of the roller 7, of which side shape is square, is made to agree with the contour of the loaded roller rolling path 9, of which sectional shape is also square, when each roller 7 is scooped up from and returned to the loaded roller rolling path 9.

Moreover, the attitude of each roller 7 is rotated by an angular amount which is almost equal to the opening angle γ between the paired direction-change paths 16. Hence, by this rotation, the roller loaded in the one direction (1) of the axial line of the screw shaft 5 can be returned to the loaded roller rolling path 9 with no rotation (i.e., can be returned in a state where the roller is loaded again in the one direction (1) of the axial line of the screw shaft 5).

In this way, the roller screw has the non-loaded roller return path 10 with the straight path 11 twisted as described. This is because it is necessary to make the attitude of each roller 7 agree with the shape of the loaded roller rolling path 9 with the square section, when each roller 7 is scooped up from the loaded roller rolling path 9 onto the non-loaded roller return path 10 and is returned from the non-loaded roller return path 10 to the loaded roller rolling path 9. In addition to this feature, there is another feature that the seam joint from the loaded roller rolling path 9 to the non-loaded roller return path 10 is also twisted slightly. Hence the rollers 7 are assisted in changing their directions by slight rotation thereof resulting from the slight twist. Further, from a more detailed viewpoint, the loaded roller rolling path 9 is spiral, so that the path itself is twisted, assisting the direction change.

When the rollers 7 move on along the twisted circulation path, a preceding roller 7 rotates its attitude relative to the following roller 7 (in detail, when being viewed along the moving direction of the rollers 7, the axial line of the preceding roller 7, which has been kept perpendicularly relative to the axial line of the following roller 7, is rotated relatively by a slight amount of angle).

In the present embodiment, each of the retainers 8 is divided into first and second divided members and the first divided member is made rotatable to the second divided member, whereby each retainer 8, by itself, is given a degree of freedom of the rotation. Thus the preceding roller 7 is allowed to rotate its attitude relative to the following roller 7.

Figure 19:
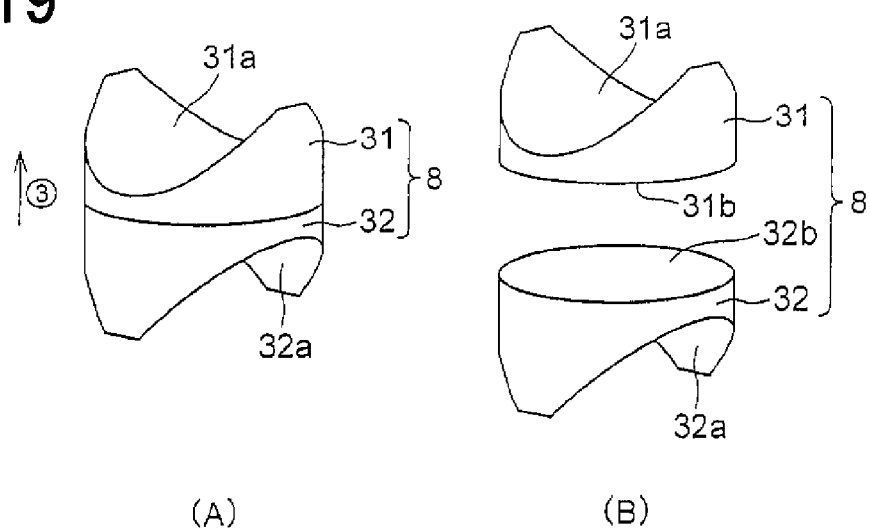
FIGS. 19(A) and 19(B) are perspective views of a retainer (FIG. 19(A) is a perspective view where the parts thereof are assembled with each other and FIG. 19(B) is a perspective view where the parts thereof are disassembled from each other).

FIGS. 19(A) and 19(B) show each of the retainers 8. Each retainer 8 is sandwiched between rollers 7 forming a pair. The retainer 8 shown in FIG. 19 is formed into a substantially cylindrical shape and divided into a first divided member 31 and a second divided member 32 in the up-and-down direction (i.e., corresponding to the moving direction (3) of the rollers 7). On the first divided member 31, a first roller contact surface 31a which contacts, of the paired rollers 7, one roller 7 is formed. The same is true of the second divided member 32. That is, on the second divided member 32, a second roller contact surface 32a which contacts, of the paired rollers 7, the other roller 7 is formed. The first and second contact surfaces 31a and 32a are both formed to have curved concave surfaces, respectively, which are in agreement with the external shape of each roller 7. The concave of each of the first and second contact surfaces 31a and 32a has a curvature radius which is made slightly larger than the radius of each of the rollers 7. Therefore, each roller 7 is permitted to linearly contact the bottom of the concave given by the first or second roller contact surface 31a or 32a Each retainer 8 is divided into two parts by a level surface (i.e., a surface perpendicular to the moving direction (3) of the rollers 7). The first divided member 31 has a first retainer contact surface 31b which contacts the second divided member 32 and is formed into a plane perpendicularly crossing the moving direction (3) of the rollers 7. The second divided member 32 has a second retainer contact surface 32b which contacts the first divided member 31 and is formed into a plane perpendicularly crossing the moving direction (3) of the rollers 7. This permits the first divided member 31 to rotate relative to the second divided member 32 about a rotation axis served by the moving direction (3) of the rollers 7.

Figure 20:
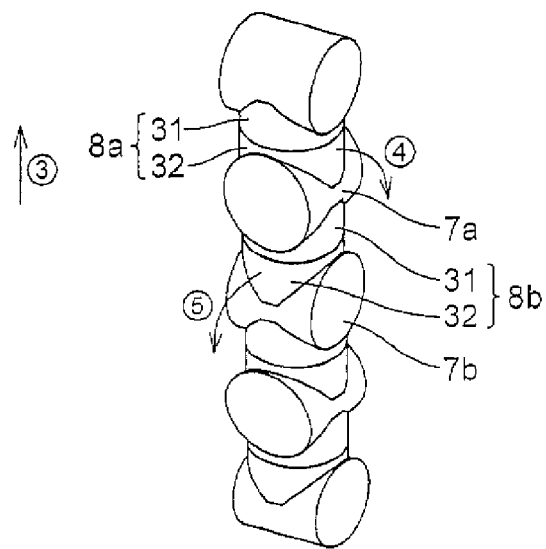
FIG. 20 is a perspective view showing a chain of rollers in which the retainers are interposed between rollers.
Figure 21:
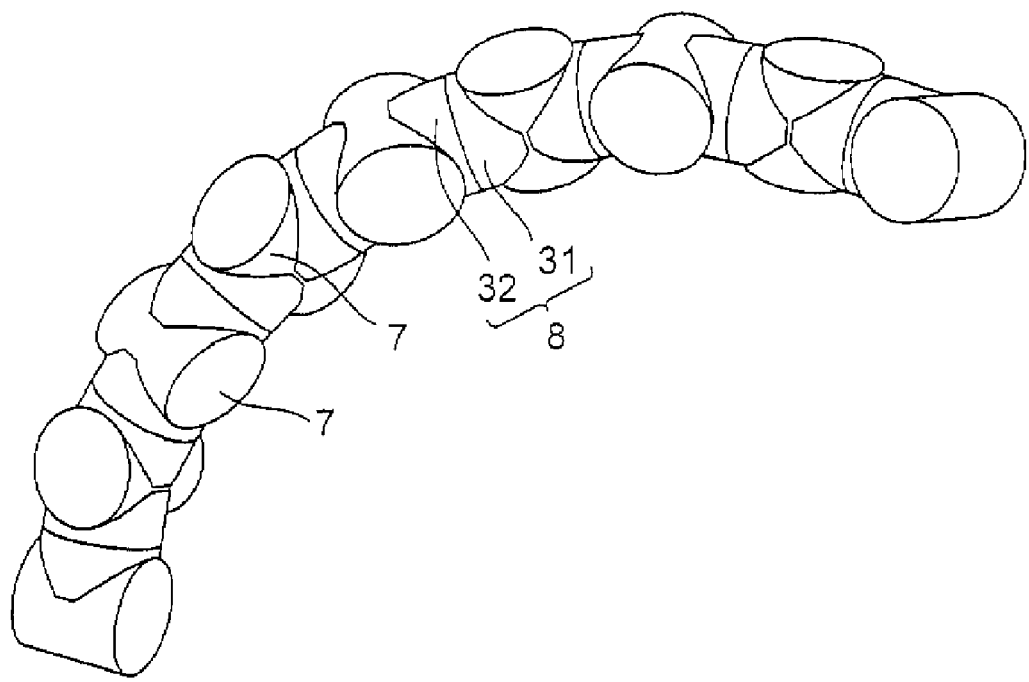
FIG. 21 is a perspective view showing the chain of rollers, of which rolling direction is changed.

FIG. 20 exemplifies a chain of rollers in which two retainers 8a and 8b are disposed. The retainer 8a is able to move in a first direction (4) which is along a contact surface between the retainer 8a and a roller 7a following this retainer 8a. Further, the retainer 8b, which follows the roller 7a, is able to move in a second direction (5) which is along a contact surface between the retainer 8b and a roller 7b following this retainer 8b (, where the second direction is a direction crossing perpendicularly the first direction (4), when being viewed along the moving direction (3) of the rollers 7). That is, the rolling direction can be changed between the two directions which are perpendicular to the moving direction (3) of the rollers 7. In addition, when the retainers 8a and 8b according to the present embodiment are used, the roller 7a can be rotated relative to the roller 7b on the moving direction (3) of the rollers.

Figure 12:
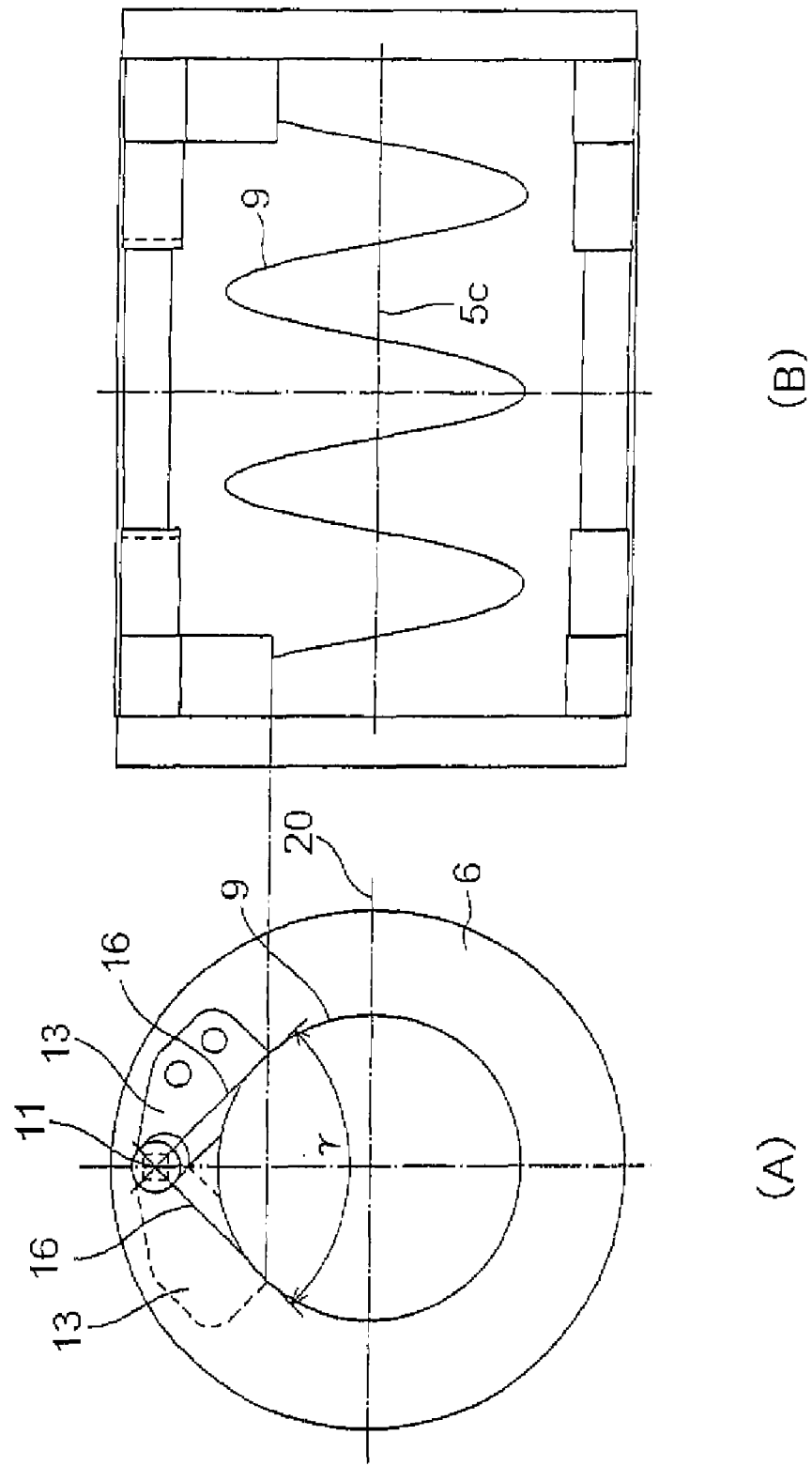
FIGS. 12(A) and 12(B) are views explaining a positional relationship between a direction-change path component secured to one side surface of the nut and a direction-change path component secured to the other side surface of the nut (FIG. 12(A) is a frontal view of the nut and FIG. 12(B) is a sectional view of the nut).
Figure 13:
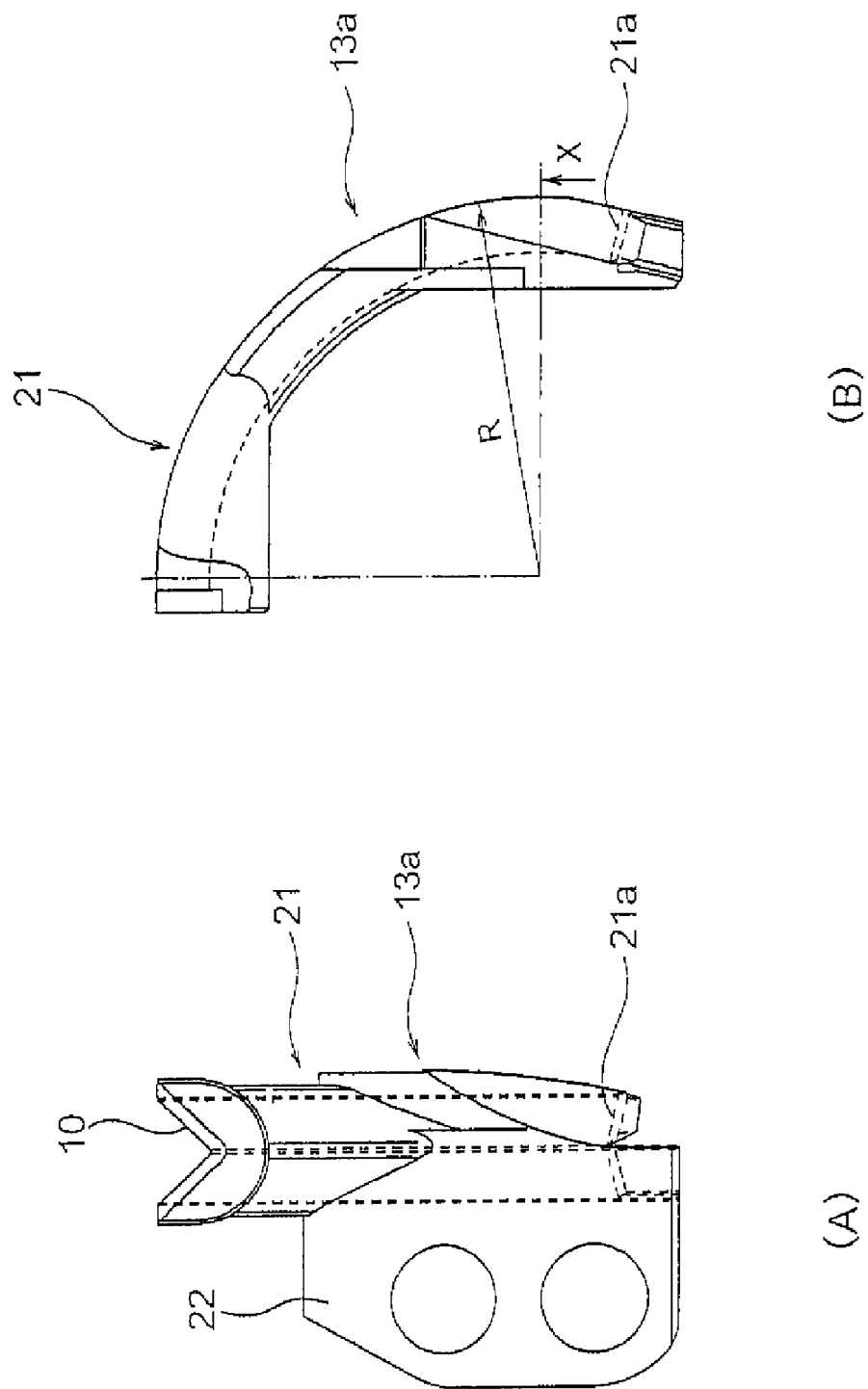
FIGS. 13(A) and 13(B) are views showing the inner circumferential side of the direction-change path component (FIG. 13(A) is a frontal view of the component and FIG. 13(B) is a side view of the component).
Figure 14:
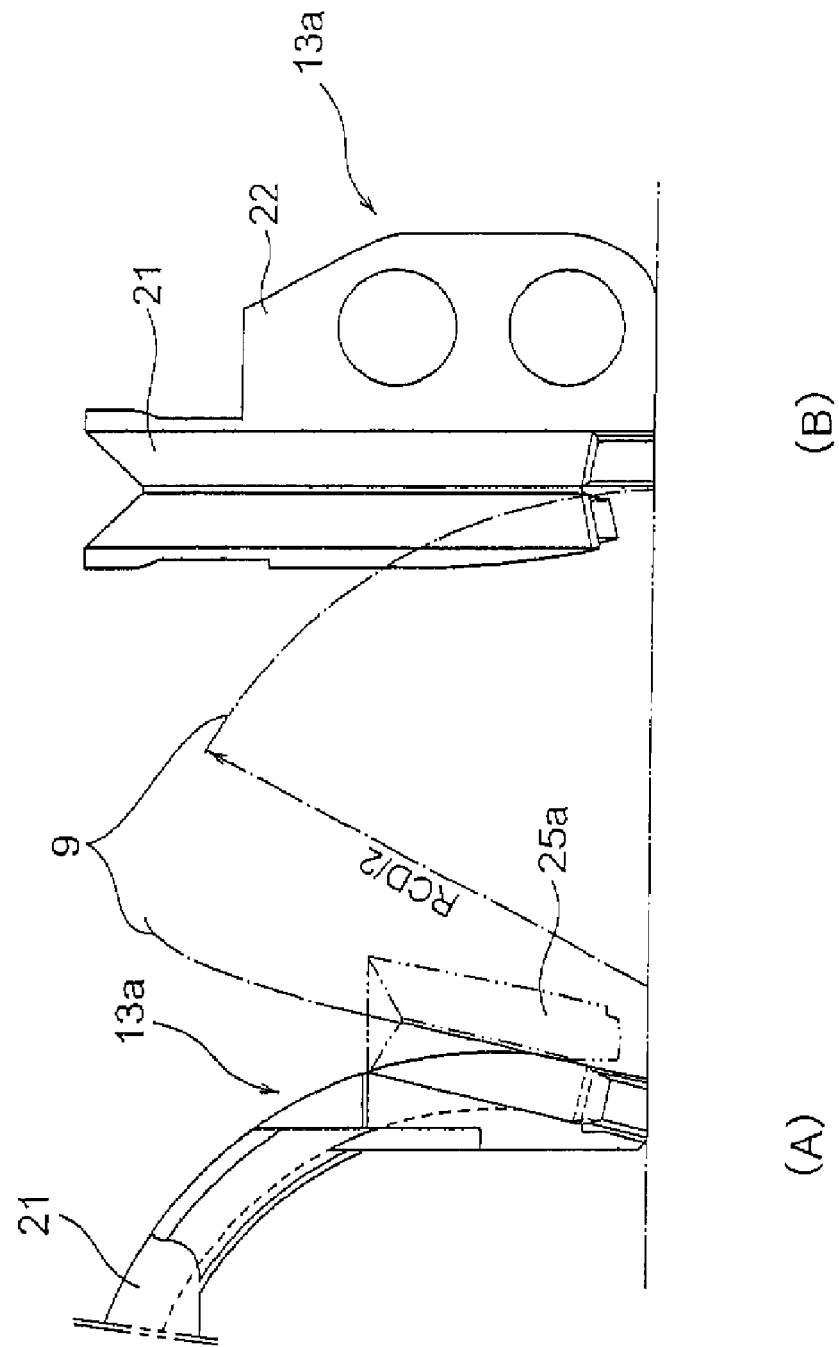
FIGS. 14(A) and 14(B) are views further showing the inner circumferential side of the direction-change path component (FIG. 14(A) is a side view of the component and FIG. 14(B) is a rear view of the component).
Figure 15:
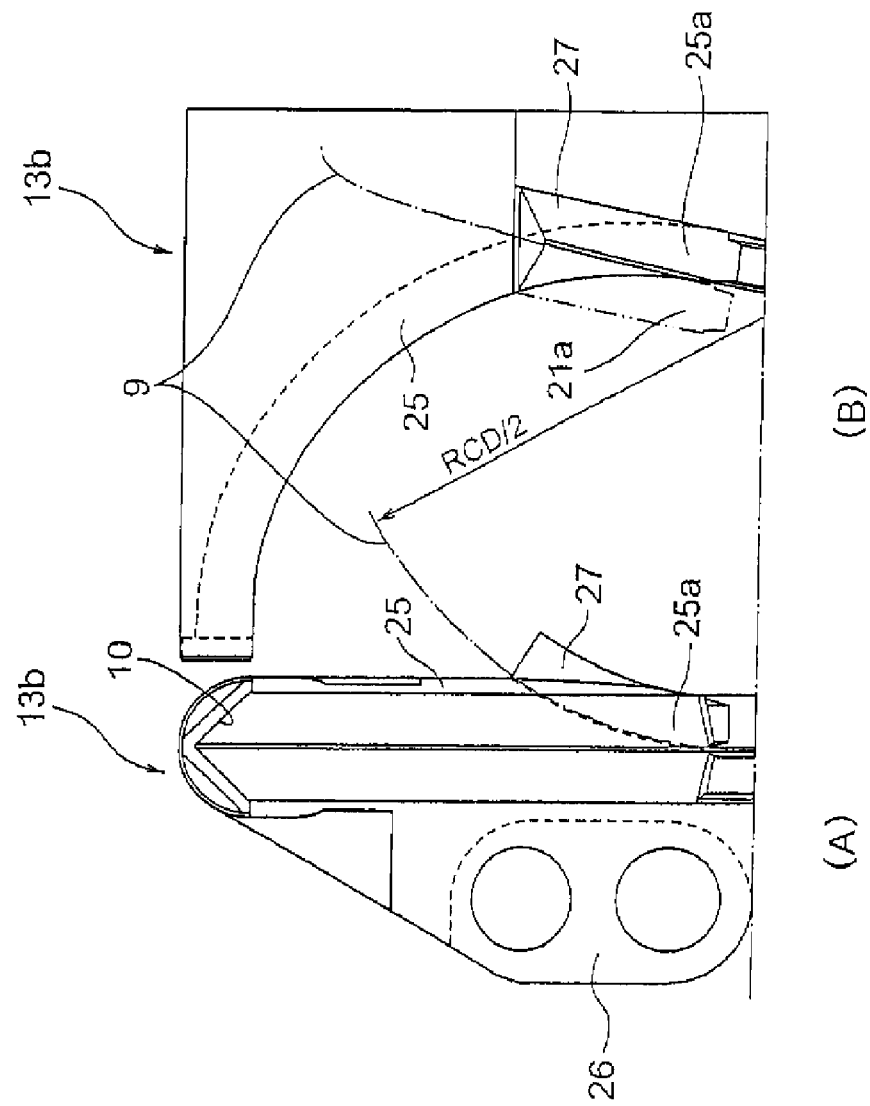
FIGS. 15(A) and 15(B) are views showing the outer circumferential side of the direction-change path component (FIG. 15(A) is a frontal view of the component and FIG. 15(B) is a side view of the component).
Figure 16:
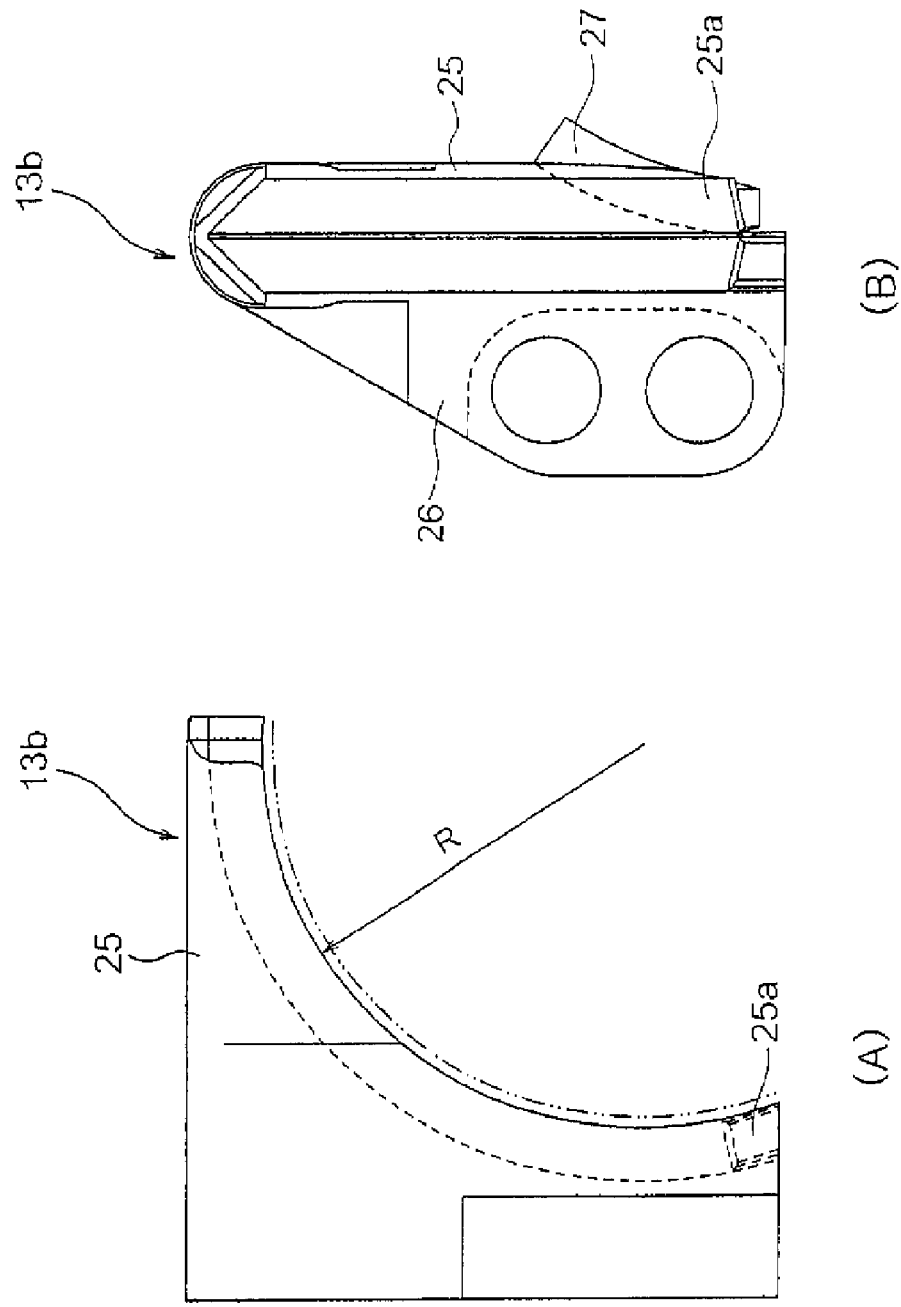
FIGS. 16(A) and 16(B) are views further showing the outer circumferential side of the direction-change path component (FIG. 16(A) is a side view of the component and FIG. 16(B) is a frontal view of the component).

FIG. 12 shows an example in which the rolling direction of each roller 7 is changed. The chain of rollers is able to have multiple degrees of freedom, whereby the direction can be changed smoothly even in complex circulation paths.

The first and second divided members 31 and 32 of each retainer according to the present embodiment are not coupled with each other, and are able to move independently of each other. Both the first and second divided members 31 and 32 are positionally restricted by the adjacent rollers 7 and/or the walls of the circulation path. Hence, without coupling both the first end second divided members 31 and 32 with each other, the problems that the first divided member 31 is shifted from the second divided member 32 or the first and second divided members 32 are separated from each other are preventable well.

The first and second divided members 31 and 32 are produced by injection-molding resin or elastomer.

Figure 22:
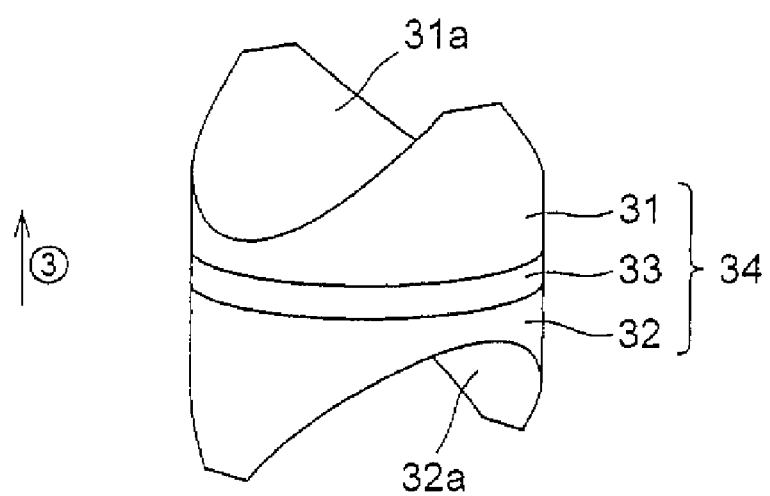
FIG. 22 is a perspective view showing another example of the retainer.
Figure 23:
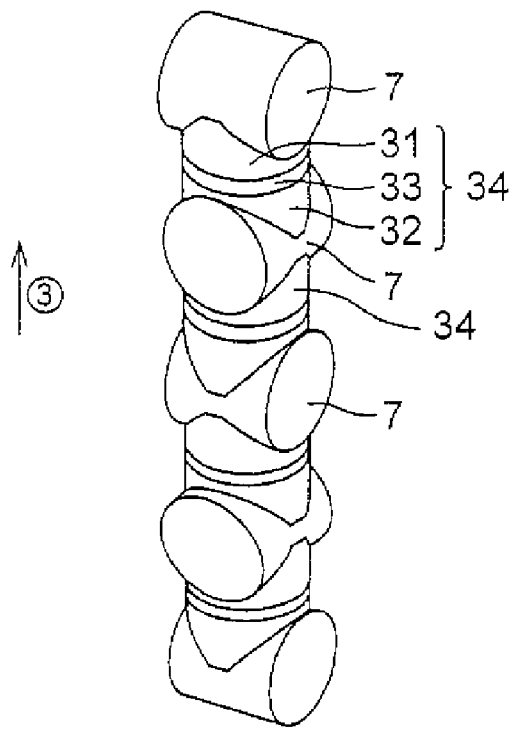
FIG. 23 is a perspective view showing a chain of rollers in which the retainers are interposed between rollers.

FIGS. 22 and 23 show another example of the retainers, in which a retainer 34 is illustrated. In cases where the first and second divided members 31 and 32 are uncoupled with each other, it is obliged that the two divided retainer parts should be assembled into the circulation path. However, this way involves a difficulty in the assembling work. To solve this difficulty, the retainer 34 according to the present example adopts an elastic member 33, such as a rubber member, to couple the first and second divided members 31 and 32 with each other. In this embodiment, the first and second divided members 31 and 32 are same in their structures as the retainers 8 according to the foregoing example, and so the same reference numbers are given to the corresponding parts for the sake of simplified explanations.

Each of the retainers 34 is structured such that the first and second divided members 31 and 32 are coupled with each other with the elastic member 33 therebetween. Thus, relative to the second divided member 32, the first divided member 31 can be rotated slightly on the rotation axis served by the moving direction (3) of the rollers 7. Like the retainer 8 shown in FIG. 19, the chain of rollers is given multiple degrees of freedom accordingly, leading to smooth direction changes in even complex circulation paths. Additionally, the elastic member 33 is allowed to partially extend and shrink, so that the first divided member 31 can be made oblique to the second divided member 32, providing a further degree of freedom to its movement. The retainer according to this example is produced by coinjection-molding resin and rubber, for example.

Compared to the retainer 8 shown in FIG. 19, the retainer 34 according to this example tends to be thicker. It is thus easier that this drawback brings about a disadvantage that the number of rollers being disposed in the circulation path is lessened. To cope with this difficulty, the thickness of each elastic member 33 is made as thinner as possible.

Figure 24:
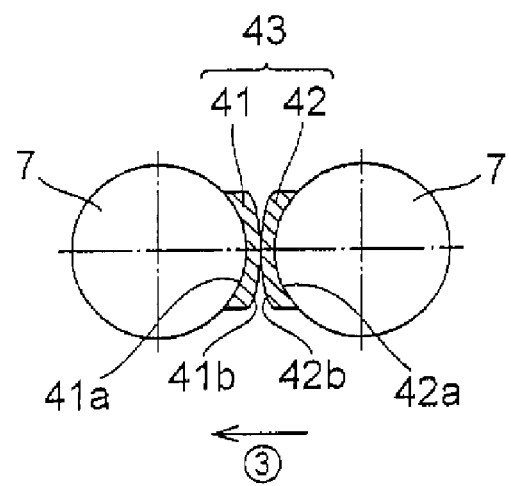
FIG. 24 is a perspective view showing another example of the retainer.

FIG. 24 exemplifies another structure of the retainers, in which a retainer 43 is illustrated. The retainer 43 according to this example is also divided into a first divided member 91 and a second divided member 42 in the moving direction (3) of the rollers. On the first divided member 41, there is a first roller contact surface 41a formed into a concave curved surface which is made in curvature to agree with the outer circumferential surface of each roller 7. Like the above, on the second divided member 42, there is also a second roller contact surface 42a formed into a concave curved surface which is made in curvature to agree with the outer circumferential surface of each roller 7. In addition, the first divided member 41 has a first retainer contact surface 41b contacting the second divided member 42 and being formed into a convex curved surface, which is for example a sphere. The second divided member 42 has a second retainer contact surface 42b contacting the first divided member 41 and being also formed into a convex curved surface, which is for example a sphere.

When the roller screw is provided with a primary load direction, the rollers 7 under load are arranged in parallel with each other and the number of threads in which the rollers 7 under load pass is made greater. In this case, provided that the rollers 7 are viewed along the moving direction (3) thereof, the axial lines of a pair of rollers 7 with a one retainer 43 sandwiched therebetween are kept in parallel with each other. This is called parallel arrangement.

Figure 25:
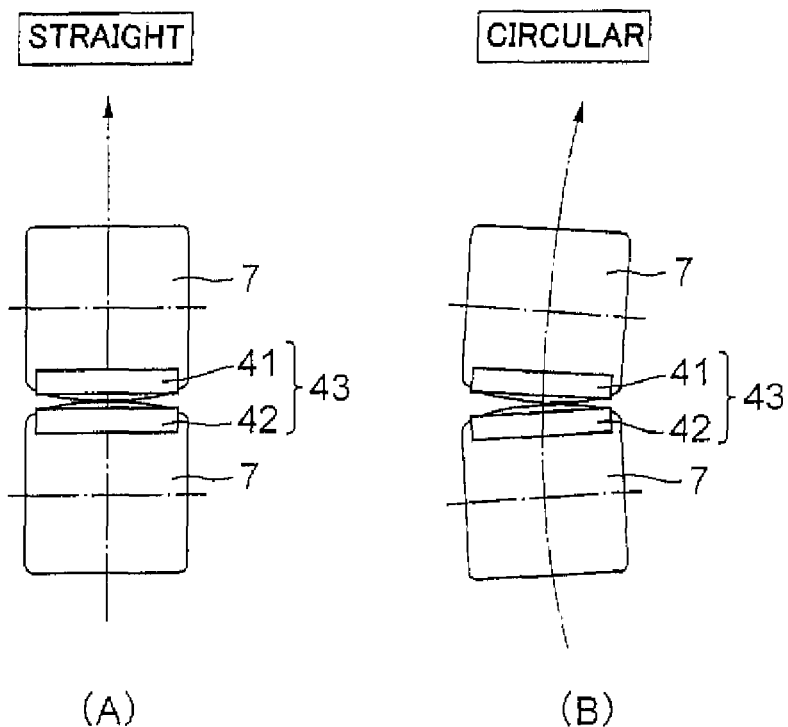
FIGS. 25(A) and 25(B) are perspective views showing still another example of the retainer.
Figure 26:
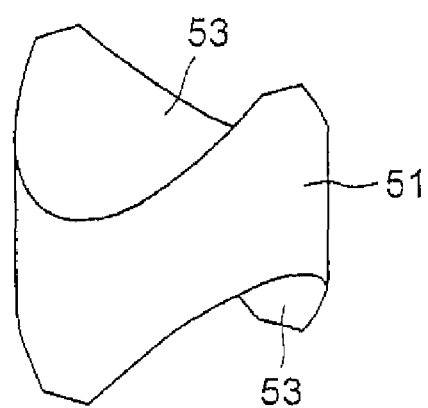
FIG. 26 is a sectional view showing a conventional retainer.
Figure 27:
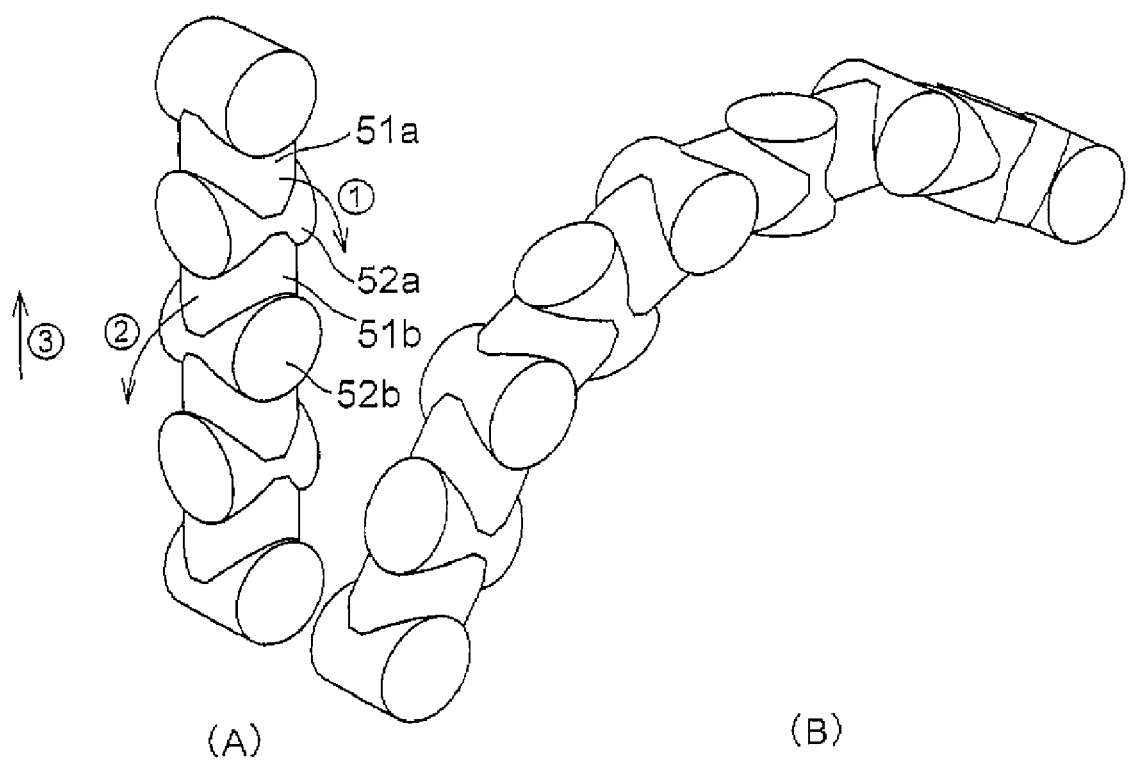
FIGS. 27(A) and 27(B) show perspective views of a chain of rollers in which the conventional retainers are combined with the roller chain at respective positions thereof.

In the parallel arrangement of the rollers, the positional relationships between rollers change during movements of the rollers along the loaded roller rolling path 9 and the non-loaded roller return path 10. By way of example, FIG. 25(A) shows a positional relationship between rollers 7 which are under movement along a linear track, whilst FIG. 25(B) shows a positional relationship between rollers 7 which are under movement along a circular arc track.

For the parallel arrangement of the rollers 7 using the retainers 8 shown in FIG. 19, a certain preceding roller 7 is allowed to change its rolling direction, relative to the roller 7 following the preceding roller 7, to only one direction (i.e., to either the (4) direction or the (5) direction) crossing perpendicularly the moving direction (3) of the rollers 7. Thus the degree of freedom of direction changes is reduced. However, the retainers 43 according to the present example adopt the structure in which the contact surfaces of the first and second divided members 41 and 42 are curved. This makes it possible to give a further degree of freedom of movement to the direction changes of the rollers, in addition to the degree of freedom of the rotation. Because the first divided member 41 can be moved three-dimensionally relative to the second divided member 42, the retainers 43 can easily follow changes in the positional relationship between the rollers 7.

Though the retainers 43 according to the present example are especially effective for the case in which the rollers 7 are subjected to the parallel arrangement, this is not a decisive list. As a matter of course, it is possible to apply the retainers 43 to the rollers 7 which are subjected to the crossing arrangement. Moreover, the retainers 8 shown in FIG. 19 can be applied to the rollers 7 undergoing the parallel arrangement, although the degree of freedom of movement is reduced in some degree.

The present invention cannot be limited to the foregoing embodiments, but can be put into practice in other forms as well, unless that such other forms depart from the gist of the present invention. By way of example, as to the circulation technique used by the roller screw, it is not limited to the end-cap technique explained in the foregoing embodiments, but may employ various techniques such as return pipe technique and deflector technique.

In addition, without being limited to applications to the roller screw, the retainers according to the embodiments can be incorporated into a variety of types of motion guide devices such as linear guides, curved motion guide devices, and splines.

Further, the foregoing embodiments have explained the cylindrical rollers each having a diameter and an axial length which are approximately equal to each other and the roller circulation path whose sectional form is square. Alternatively, cylindrical rollers each having a diameter and an axial length which are different from each other may be employed, where the section of a roller circulation path is formed into a rectangle complying in shape with the rollers. Still further, conical rollers may be used, where the section of a roller circulation path is formed into a trapezoid complying in shape with the conical rollers.

Further, the retainers each divided into the first and second divided members and the conventional retainers with no such a division given may be combined with each other for use in a chain of rollers.

The present specification is based on Japanese Patent Application No. 2005-030848 filed on Feb. 7, 2005, the entire contents of which are expressly incorporated by reference herein.

The invention claimed is:

1. A motion guide device comprising:
   a track member having a roller rolling part formed to allow roller rotation;
   a moving member having a loaded roller rolling part formed facing the roller rolling part;
   a plurality of rollers arranged on a roller circulation path including a loaded roller rolling path formed between the roller rolling part of the track member and the loaded roller rolling part of the moving member and a non-loaded roller return path connecting an end of the loaded roller rolling path to an opposite end thereof; and
   a plurality of retainers each interposed between adjacent two rollers of the plurality of rollers,
   wherein
   the retainers are mutually separated,
   each of the retainers is divided into a first divided member contacting one of the adjacent two rollers and a second divided member contacting the other of the adjacent two rollers,
   the first divided member is allowed to rotate relative to the second divided member about an axis parallel to a moving direction of the rollers, and
   the non-loaded roller return path has a straight path that is twisted so that an attitude of each of the rollers is rotated when the roller moves in the straight path.

2. The motion guide device according to claim 1, wherein the first divided member is not coupled with the second divided member.

3. The motion guide device according to claim 2, wherein the first divided member has a first retainer contact surface contacting the second divided member and being formed into a plane crossing perpendicularly to a moving direction of the rollers, and
   the second divided member has a second retainer contact surface contacting the first divided member and being formed into a plane crossing perpendicularly to the moving direction of the rollers.

4. The motion guide device according to claim 2, wherein the first divided member comprises a first retainer contact surface contacting the second divided member and being formed into a convex curved surface directed toward the second divided member, and
   the second divided member comprises a second retainer contact surface contacting the first divided member and being formed into a convex curved surface directed toward the first divided member.

5. The motion guide device according to claim 4, wherein the rollers are parallel-arranged in such a manner that each adjacent two of rollers with corresponding one of the retainers sandwiched therebetween have axial lines parallel with each other, when the rollers are viewed along a moving direction thereof.

6. The motion guide device according to claim 1, wherein the first divided member and the second divided member are coupled with each other with an elastic member placed therebetween.

7. The motion guide device according to any one of claims 1, 2, 3, and 6, wherein the plurality of rollers are cross-arranged in such a manner that each adjacent two of the rollers with corresponding one of the retainers sandwiched therebetween have axial lines perpendicular to each other when the rollers are viewed along the moving direction of the rollers.

8. The motion guide device according to any one of claims 1, 2, 3 and 6, wherein
   the first divided member has a first roller contact surface contacting one of the adjacent two of the rollers and having a concave curved surface which is in agreement with an outer shape of the roller, and
   the second divided member has a second roller contact surface contacting the other of the adjacent two of the rollers and having a concave curved surface which is in agreement with an outer shape of the roller.

9. A roller screw comprising:
   a screw shaft having a spiral roller rolling groove formed an outer circumferential surface thereof;
   a nut having a loaded roller rolling groove formed facing the roller rolling groove;
   a plurality of rollers arranged on a roller circulation path including a loaded roller rolling path formed between the roller rolling groove of the screw shaft and the loaded roller rolling groove of the nut and a non-loaded roller return path connecting an end of the loaded roller rolling path to an opposite end thereof; and
   a plurality of retainers each interposed between adjacent two rollers of the plurality of rollers,
   wherein the retainers are mutually separated,
   each of the retainers is divided into a first divided member contacting one of the adjacent two rollers with the retainer sandwiched therebetween and a second divided member contacting the other of the adjacent two rollers,
   the first divided member is allowed to rotate relative to the second divided member about an axis parallel to a moving direction of the rollers, and
   the non-loaded roller return path has a straight path that is twisted so that an attitude of each of the rollers is rotated when the roller moves in the straight path.

* * * * *